US012772332B2

(12) United States Patent
Li

(10) Patent No.: US 12,772,332 B2
(45) Date of Patent: Oct. 20, 2026

(54) INFORMATION PROCESSING METHOD AND APPARATUS, COMMUNICATION DEVICE, AND STORAGE MEDIUM

(71) Applicant: Beijing Xiaomi Mobile Software Co., Ltd., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 238 days.

(21) Appl. No.: 18/571,517

(22) PCT Filed: Jun. 18, 2021

(86) PCT No.: PCT/CN2021/101079
§ 371 (c)(1),
(2) Date: Dec. 18, 2023

(87) PCT Pub. No.: WO2022/261983
PCT Pub. Date: Dec. 22, 2022

(65) Prior Publication Data

US 2024/0357699 A1 Oct. 24, 2024

(51) Int. Cl.
*H04W 76/28* (2018.01)

(52) U.S. Cl.
CPC .................................. *H04W 76/28* (2018.02)

(58) Field of Classification Search
CPC ... H04W 76/28; H04W 68/00; H04W 68/005; H04W 48/12; H04W 68/02
See application file for complete search history.

(56) References Cited

U.S. PATENT DOCUMENTS

2016/0044605 A1* 2/2016 Vajapeyam ........... H04W 76/28 370/311
2016/0192292 A1* 6/2016 Höglund ............... H04W 68/02 370/311
2017/0006659 A1* 1/2017 Jha ...................... H04W 28/082
2017/0048842 A1* 2/2017 Han .................. H04W 52/0216
2017/0048920 A1* 2/2017 Kim ...................... H04W 48/16
2018/0132240 A1* 5/2018 Yang ................. H04W 72/0453
(Continued)

FOREIGN PATENT DOCUMENTS

CN 109769309 A 5/2019
CN 109923915 A 6/2019
(Continued)

OTHER PUBLICATIONS

ZTE Corp et al. "R2-2009051 "Discussion for clarification on SIB acquisition for eMTC UE in RRC-Inactive"" *3GPP TSG-RAN WG2 Meeting #112 E-meeting, Oct. 23, 2020 (Oct. 23, 2020). section 2.*
(Continued)

*Primary Examiner* — Sai Aung
(74) *Attorney, Agent, or Firm* — Volpe Koenig

(57) ABSTRACT

A method, communication device, and computer-readable medium for improving the power consumption of User Equipment (UE) in a wireless communication network. The power consumption of the UE is improved by: acquiring, in response to determining that a system message update comparison cycle of UE in an inactive state is longer than a system message update cycle, an updated system message according to an extended system message update cycle.

20 Claims, 8 Drawing Sheets

(56) References Cited

U.S. PATENT DOCUMENTS

| | | | | |
|---|---|---|---|---|
| 2020/0021964 | A1* | 1/2020 | Dell'Aera | H04W 48/18 |
| 2021/0314909 | A1* | 10/2021 | Agiwal | H04W 72/23 |

FOREIGN PATENT DOCUMENTS

| | | | |
|---|---|---|---|
| CN | 111787611 | A | 10/2020 |
| CN | 112438058 | A | 3/2021 |
| CN | 112788618 | A | 5/2021 |
| WO | 2020091480 | A1 | 5/2020 |
| WO | 2020196202 | A1 | 10/2020 |

OTHER PUBLICATIONS

ZTE. "R2-2010816 "Report of [AT112-e][403][eMTC R16] SIB acquisition for UEs in RRC_Inactive (ZTE)"" *3GPP TSG-RAN WG2 Meeting #112 electronic, Nov. 11, 2020* (*Nov. 11, 2020*). *entire document.*

Ericsson. R2-2101467 "Clarification of SI acquisition for UEs configured with eDRX in RRC_Inactive" *3GPP WG-RAN2 Meeting #113-e, Jan. 15, 2021* (*Jan. 15, 2021*). *entire document.*

Xiaomi Communications, "Discussions on e-DRX for Redcap Devices", 3GPP TSG-RAN WG2 Meeting #112 electronic, R2-2008948, Nov. 2-13, 2020.

"Discussion for clarification on SIB acquisition for eMTC UE in RRC_Inactive", R2-2009051, 3GPP TSG-RAN WG2 Meeting #112 E-meeting, Nov. 2-13, 2020.

* cited by examiner

INFORMATION PROCESSING METHOD AND APPARATUS, COMMUNICATION DEVICE, AND STORAGE MEDIUM

CROSS REFERENCE TO RELATED APPLICATION

The present application is a U.S. National Stage of International Application No. PCT/CN2021/101079, filed on Jun. 18, 2021, the entire content of which is incorporated herein by reference for all purposes.

BACKGROUND

Typically, a current mechanism for a system message update is to monitor a system message update notification at least once during discontinuous reception (DRX). Only an extended discontinuous reception (eDRX) cycle configured for user equipment (UE) in a radio resource control (RRC) idle state and acquisition of an updated system message when the eDRX cycle is configured for the UE in the RRC idle state are defined in an existing communication protocol.

SUMMARY

According to a first aspect, a method for processing information is provided in an example of the disclosure. The method is performed by user equipment (UE) and includes:

acquiring, in response to determining that a system message update comparison cycle of UE in an inactive state is longer than a system message update cycle, an updated system message according to an extended system message update cycle.

According to a second aspect, a communication device is provided in an example of the disclosure. The communication device includes:

a processor; and a memory configured to store a processor-executable instruction; where the processor is configured to implement the method for processing information according to any one of the examples of the disclosure when running the executable instruction.

According to a third aspect, a non-transitory computer-readable storage medium is provided in an example of the disclosure. The computer storage medium stores a computer-executable instruction, where the computer-executable instruction implements the method for processing information according to any one of the examples of the disclosure when executed by a processor.

DETAILED DESCRIPTION

Figure 1:
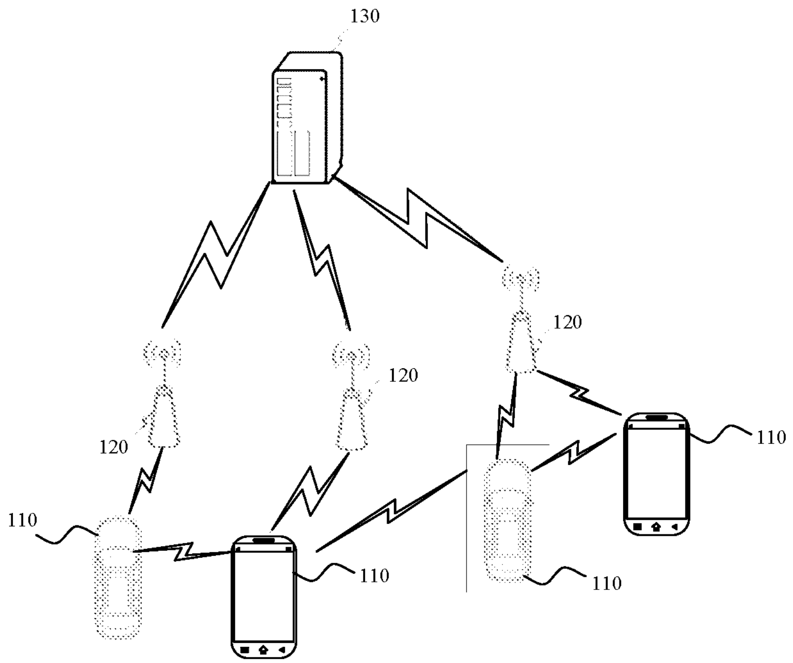
FIG. 1 is a schematic structural diagram of a radio communication system.

Examples will be described in detail here and shown in the accompanying drawings illustratively. When the following description relates to the accompanying drawings, the same numbers in different accompanying drawings denote the same or similar elements unless otherwise indicated. The embodiments described in the following examples do not denote all embodiments consistent with the examples of the disclosure. On the contrary, the embodiments are merely examples of apparatuses and methods consistent with some aspects of the examples of the disclosure as recited in the appended claims.

The terms used in the examples of the disclosure are merely to describe the particular examples, rather than limit the examples of the disclosure. The singular forms such as "a," "an," and "this" used in the examples of the disclosure and the appended claims are also intended to include the plural forms, unless otherwise clearly stated in the context. It also needs to be understood that the term "and/or" used here means and encompasses one or any or all possible combinations of a plurality of associated items listed.

It needs to be understood that although the terms first, second, third, etc. may be employed in the examples of the disclosure to describe various information, this information should not be limited to this. These terms are merely used to distinguish between the same type of information. For example, first information can also be referred to as second information, and similarly, second information can also be referred to as first information, without departing from the scope of the examples of the disclosure. The word "if," as used here, can be interpreted as "at the time of," "when," or "in response to determining," depending on the context.

The disclosure relates to, but is not limited to, the technical field of communication, and in particular, to a method and apparatus for processing information, a communication device, and a storage medium.

A mechanism for a system message update is to monitor a system message update notification at least once during discontinuous reception (DRX). In some embodiments, an extended discontinuous reception (eDRX) cycle configured for user equipment (UE) in a radio resource control (RRC) idle state and acquisition of an updated system message when the eDRX cycle is configured for the UE in the RRC idle state are defined in a communication protocol. However, no updated system message is defined when an eDRX cycle is configured for UE in an RRC inactive state. For example, when a cycle parameter configured for the UE in the RRC inactive state is greater than a system message update cycle, it is impossible to select an appropriate timing to ensure that the power consumption of the UE is taken into account while the updated system message is received.

A method and apparatus for processing information, a communication device, and a storage medium are disclosed in examples of the disclosure.

According to a first aspect, a method for processing information is provided in an example of the disclosure. The method is performed by user equipment (UE) and includes:

acquiring, in response to determining that a system message update comparison cycle of UE in an inactive state is longer than a system message update cycle, an updated system message according to an extended system message update cycle.

According to a second aspect, an apparatus for processing information is provided in an example of the disclosure. The apparatus is applied to UE and includes:

an acquisition module configured to acquire, in response to determining that a system message update comparison cycle of UE in an inactive state is longer than a system message update cycle, an updated system message according to an extended system message update cycle.

According to a third aspect, a communication device is provided in an example of the disclosure. The communication device includes:

a processor; and a memory configured to store a processor-executable instruction; where the processor is configured to implement the method for processing information according to any one of the examples of the disclosure when running the executable instruction.

According to a fourth aspect, a non-transitory computer-readable storage medium is provided in an example of the disclosure. The non-transitory computer-readable storage medium stores a computer-executable instruction, where the computer-executable instruction implements the method for processing information according to any one of the examples of the disclosure when executed by a processor.

The technical solutions, according to the examples of the disclosure, can have the beneficial effects as follows:

In the example of the disclosure, in response to determining that the system message update comparison cycle of the UE in the inactive state is longer than the system message update cycle, the updated system message may be acquired according to the extended system message update cycle. In this way, the UE in the inactive state may acquire the updated system message based on the extended system message update cycle when the system message update comparison cycle is longer than the system message update cycle is introduced in the example of the disclosure. Moreover, a success rate of receiving the updated system message can be increased while power consumption of the UE can be reduced.

With reference to FIG. 1, a schematic structural diagram of a radio communication system according to an example of the disclosure is shown. As shown in FIG. 1, the radio communication system is a communication system based on a cellular mobile communication, and may include several pieces of user equipment 110 and several base stations 120.

The user equipment 110 may be a device providing voice and/or data connectivity for a user. The user equipment 110 may communicate with one or more core networks via a radio access network (RAN). The user equipment 110 may be an Internet of Things user equipment, such as a sensor device, a mobile phone (or referred to as a "cellular" phone), and a computer having Internet of Things user equipment, for example, a stationary, portable, pocket, handheld, intra-computer, or vehicle-mounted apparatus. For example, the user equipment 110 may be a station (STA), a subscriber unit, a subscriber station, a mobile station, a mobile, a remote station, an access point, a remote terminal, an access terminal, a user terminal, a user agent, a user device, or user equipment. Alternatively, the user equipment 110 may also be an unmanned aerial vehicle. Alternatively, the user equipment 110 may also be a vehicle-mounted device, for example, an electronic control unit having a radio communication function, or radio user equipment externally connected to the electronic control unit. Alternatively, the user equipment 110 may also be a roadside device, for example, a street lamp, a signal lamp, etc., having a radio communication function.

The base stations 120 may be network-side devices in the radio communication system. The radio communication system may be a 4th generation mobile communication (4G) system, which is also referred to as a long-term evolution (LTE) system. Alternatively, the radio communication system may also be a 5G system, which is also referred to as a new radio (NR) system or a 5G NR system. Alternatively, the radio communication system may also be a next-generation system following the 5G system. An access network of the 5G system may be referred to as a new generation-radio access network (NG-RAN).

The base stations 120 may be evolved nodes B (eNBs) employed in the 4G system. Alternatively, the base stations 120 may also be next-generation nodes B (gNBs) employing a centralized-distributed architecture in the 5G system. When employing the centralized-distributed architecture, each base station 120 typically includes a central unit (CU) and at least two distributed units (DUs). The central unit is provided with a protocol stack of a packet data convergence protocol (PDCP) layer, a radio link control (RLC) layer, and a media access control (MAC) layer. Each distributed unit is provided with a protocol stack of a physical (PHY) layer. Specific embodiments of the base stations 120 are not limited to the examples of the disclosure.

The base stations 120 are in radio connection to the user equipment 110 through a wireless radio. In different embodiments, the wireless radio is a wireless radio based on a standard of the 4th generation mobile communication (4G) or a standard of the 5th generation mobile communication (5G), and is a new radio, for example. Alternatively, the wireless radio may also be a wireless radio based on a standard of a next generation mobile communication following 5G.

In some examples, an end-to-end (E2E) connection may also be established between the user equipment 110. For example, scenarios such as vehicle-to-vehicle (V2V) communication, vehicle-to-infrastructure (V2I) communication, and vehicle-to-pedestrian (V2P) communication in vehicle-to-everything (V2X) communication are provided.

The above user equipment may be deemed as a terminal device in the following examples.

In some examples, the above radio communication system may further encompass a network management device 130.

Several base stations 120 are individually connected to the network management device 130. The network management device 130 may be a core network device in the radio communication system. For example, the network management device 130 may be a mobility management entity (MME) in an evolved packet core (EPC). Alternatively, the network management device may also be another core network device, such as a serving gateway (SGW), a public data network gateway (PGW), a policy and charging rules function (PCRF), or a home subscriber server (HSS). An implementation form of the network management device 130 is not limited to the examples of the disclosure.

Figure 2:
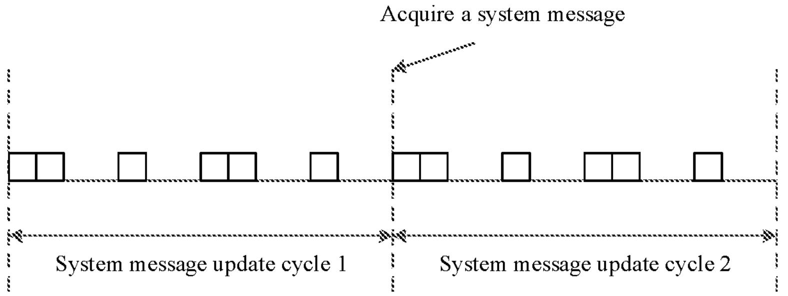
FIG. 2 is a schematic diagram of a system message update shown according to an example.

In order to better understand the technical solution described in any one of the examples of the disclosure, firstly, an extended discontinuous reception (eDRX) cycle configured for UE is partially explained as follows:

As shown in FIG. 2, in an example, the UE may update a system message at a boundary of a system message update cycle.

In an example, in response to determining that an extended discontinuous reception (eDRX) cycle configured for the UE is shorter than the system message update cycle, the UE may acquire an updated system message at the boundary of the system message update cycle.

In another example, in response to determining that an eDRX cycle of UE in an idle state is longer than the system message update cycle, the UE may acquire an updated system message according to an extended system message update cycle, where the extended system message update cycle may be specified through a communication protocol.

It can be understood that only the way to acquire the updated system message when the eDRX cycle longer than the system message update cycle is configured for the UE in the idle state is specified currently. However, the way to acquire an updated system message when the eDRX cycle longer than the system message update cycle is configured for UE in an inactive state is not specified.

Figure 3:
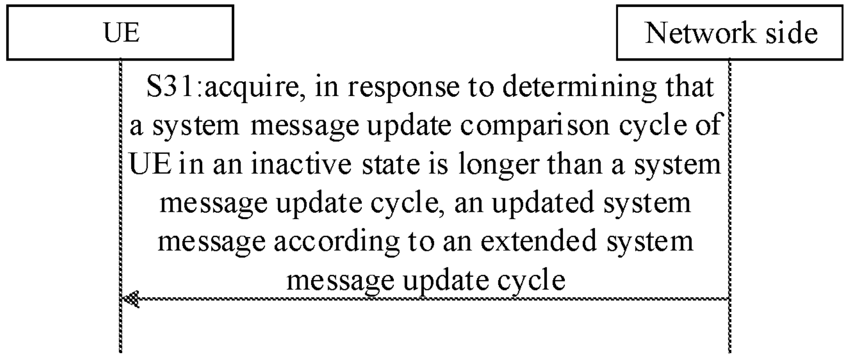
FIG. 3 is a schematic diagram of a method for processing information shown according to an example.

As shown in FIG. 3, a method for processing information is provided in an example of the disclosure. The method is performed by UE and includes:

S31: in response to determining that a system message update comparison cycle of UE in an inactive state is longer than a system message update cycle, an updated system message is acquired according to an extended system message update cycle.

In an example, the UE may be a variety of mobile terminals or fixed terminals. For example, the UE may be, but is not limited to, a mobile phone, a computer, a server, a wearable device, a game control platform, or a multimedia device.

In an example, the UE may be UE in an inactive state.

In other examples, the UE may also be UE in a non-connected state. The UE in the non-connected state includes: UE in an inactive state or UE in an idle state. For example, the method for processing information according to the example of the disclosure is performed by UE and may include: in response to determining that an eDRX cycle of the UE in the idle state is longer than the system message update cycle, an updated system message is acquired according to an extended system message update cycle.

In an example, the UE in the inactive state indicates UE in a radio resource control (RRC) inactive state. The UE in the idle state indicates UE in an RRC idle state. An eDRX cycle in an inactive state indicates an eDRX cycle in an RRC inactive state. An eDRX cycle in an idle state indicates an eDRX cycle in an RRC idle state.

In an example, the system message update comparison cycle is a cycle that may be configured to be compared with the system message update cycle. The system message update cycle may be configured to determine a system message update behavior of the UE in the inactive state. The system message update comparison cycle may be derived from a DRX cycle configured for the UE.

Some examples that are configured to determine system message update comparison cycles under different DRX or different eDRX configuration scenarios are provided below.

In an example, the system message update comparison cycle is determined based on a cycle parameter, where the cycle parameter may be directly used as the system message update comparison cycle. In the example, the cycle parameter may be compared with the system message update cycle to determine a subsequent system message update behavior of the UE.

In another example, the system message update comparison cycle may be a discontinuous reception (DRX) cycle or an extended discontinuous reception (eDRX) cycle, or may be determined through the DRX cycle or the eDRX cycle.

In an example, the eDRX cycle includes: a paging transmission window (PTW). The paging transmission window includes at least one DRX cycle.

In an example, the system message update comparison cycle may be the eDRX cycle in the idle state, or may be determined through the eDRX cycle in the idle state.

In an example, the system message update comparison cycle may be the eDRX cycle in the inactive state, or may be determined through the eDRX cycle in the inactive state.

In an example, the system message update comparison cycle may be a shorter one of the eDRX cycle in the idle state and the eDRX cycle in the inactive state, or may be determined through a shorter one of the eDRX cycle in the idle state and the eDRX cycle in the inactive state.

In an example, the system message update comparison cycle may be a shorter one of the eDRX cycle in the idle state and a radio access network (RAN) paging cycle, or may be determined through a shorter one of the eDRX cycle in the idle state and an RAN paging cycle.

In an example, the system message update comparison cycle may be a minimum of a UE-specific paging cycle, a default paging cycle, and an RAN paging cycle, or may be determined through a minimum of a UE-specific paging cycle, a default paging cycle, and an RAN paging cycle.

In an example, a UE-specific paging cycle is a cycle configured for a non-access stratum (NAS).

In an example, the default paging cycle is a DRX cycle stored in the UE by default or a DRX cycle configured by the base station.

In an example, the extended system message update cycle is N times the system message update cycle, where N is a real number greater than 1.

In another example, the extended system message update cycle is N times the system message update cycle, where N is an integer greater than 1. For example, N is 2, 3, 10, etc. Illustratively, in response to determining that the system message update cycle is 2.56 seconds, the extended system message update cycle may be 5.12 seconds, 10.24 seconds, etc.

In an example, the extended system message update cycle may be a duration agreed upon in the communication protocol.

In an example, the system message update comparison cycle of the UE in the inactive state may be the same as the extended system message update cycle. In another example, the system message update comparison cycle of the UE in the inactive state may be different from the extended system message update cycle. For example, the system message update comparison cycle may be shorter than or equal to the extended system message update cycle.

The method for processing information according to the example of the disclosure is performed by UE and may include: in response to determining that a system message update comparison cycle of UE in an inactive state is longer than a system message update cycle, an updated system message is acquired at a boundary of an extended system message update cycle.

Illustratively, in response to determining that the system message update comparison cycle is 10.24 seconds, and the system message update cycle is 2.56 seconds, the system message update comparison cycle is longer than the system message update cycle. In response to determining that the extended system message update cycle is 10.24 seconds, and boundaries of the extended system message update cycle are 0 seconds, 10.24 seconds, 20.48 seconds, 30.78 seconds, . . . L×10.24 seconds, where L is an integer, the UE in the inactive state may acquire the updated system message at least one of 10.24 seconds, 20.48 seconds, 30.78 seconds, . . . L×10.24 seconds.

In this way, the UE in the inactive state may acquire the updated system message at the boundary of the extended system message update cycle in the example. Accordingly, power consumption of the UE in the inactive state can be reduced while a success rate of acquiring the updated system message can be increased.

In other examples, the UE in the inactive state may not acquire the updated system message at the boundary of the extended system message update cycle.

The method for processing information according to the example of the disclosure is performed by UE and may include: in response to determining that a system message update comparison cycle of UE in an inactive state is longer than a system message update cycle, an updated system message is acquired at a boundary of an extended system message update cycle based on a broadcast control channel (BCCH). In this way, the UE in the inactive state can successfully acquire the updated system message in the example.

In the example of the disclosure, the UE in the inactive state may acquire the updated system message according to the extended system message update cycle in response to determining that the system message update comparison cycle is longer than the system message update cycle. In this way, the UE in the inactive state can acquire the updated system message based on the extended system message update cycle in response to determining that the system message update comparison cycle longer than the system message update cycle is introduced in the example of the disclosure. Accordingly, the success rate of receiving the updated system message can be increased while energy consumption, such as power consumption of the UE, can also be taken into account.

The method for processing information according to the example of the disclosure is performed by UE and may include: in response to determining that a system message update comparison cycle of UE in an inactive state is longer than a system message update cycle, an updated system message sent by the base station is received at a boundary of an extended system message update cycle.

The method for processing information according to the example of the disclosure is performed by UE and may include: in response to determining that a system message update comparison cycle of UE in an inactive state is longer than a system message update cycle, an updated system message sent by the core network is received at a boundary of an extended system message update cycle. In this way, the UE in the inactive state may also receive the updated system message sent by the base station and forwarded by the core network in the example.

The method for processing information according to the example of the disclosure is performed by the base station and may include one of the following:

an updated system message is sent to UE in an inactive state; and alternatively, an updated system message is sent to the core network.

It needs to be noted that those skilled in the art can understand that the method according to the example of the disclosure may be performed alone or may be performed together with some methods in the example of the disclosure or some methods in the related art.

The method for processing information according to the example of the disclosure is performed by UE and may include: a system message update comparison cycle of UE in an inactive state is determined.

Figure 4:
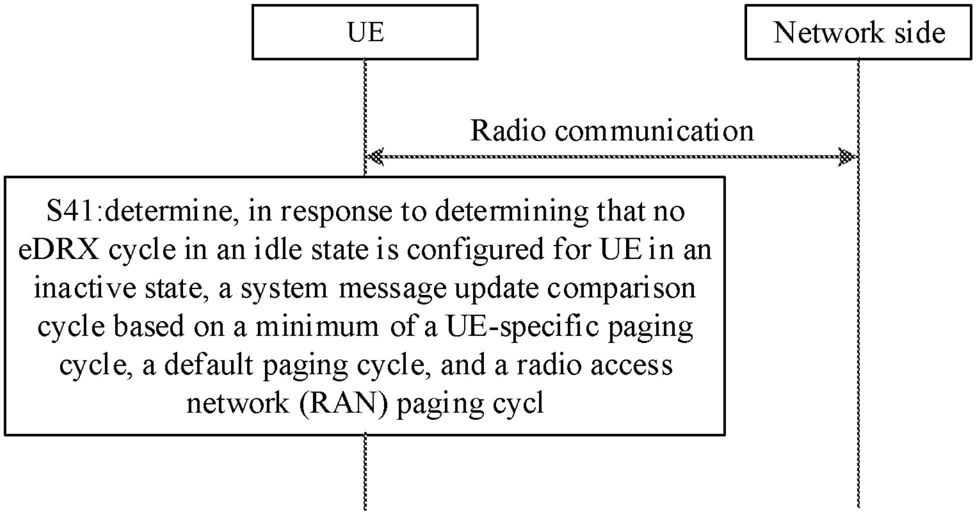
FIG. 4 is a schematic diagram of a method for processing information shown according to an example.

As shown in FIG. 4, a method for processing information is provided in an example of the disclosure. The method is performed by UE and includes:

S41: a system message update comparison cycle is determined based on a minimum of a UE-specific paging cycle, a default paging cycle, and an RAN paging cycle in response to determining that no eDRX cycle in an idle state is configured for UE in an inactive state.

In some examples of the disclosure, the system message update comparison cycle may be the system message update comparison cycle in S31, which will not be repeated here.

In an example, the system message update comparison cycle may be the minimum of the UE-specific paging cycle, the default paging cycle, and the RAN paging cycle. Illustratively, the UE-specific paging cycle is 10.24 seconds, the default paging cycle is 5.12 seconds, and the RAN paging cycle is 10.24 seconds. Accordingly, the system message update comparison cycle may be determined as the default paging cycle, i.e., 5.12 seconds.

In another example, the system message update comparison cycle may be a cycle spaced from the minimum of the UE-specific paging cycle, the default paging cycle, and the RAN paging cycle by a predetermined value. Illustratively, the UE-specific paging cycle is 10.24 seconds, the default paging cycle is 5.12 seconds, and the RAN paging cycle is 10.24 seconds. Accordingly, the system message update comparison cycle may be determined as a cycle spaced from the default paging cycle by a predetermined value, for example, any one of values in a range from 5.0 seconds to 5.4 seconds.

In some examples, the step that a system message update comparison cycle of UE in an inactive state is determined includes: the system message update comparison cycle is determined based on the minimum of the UE-specific paging cycle, the default paging cycle, and the RAN paging cycle in response to determining that no eDRX cycle in an idle state is configured for the UE in the inactive state.

In the example of the disclosure, the system message update comparison cycle is acquired based on the minimum of the UE-specific paging cycle, the default paging cycle, and the RAN paging cycle when no eDRX cycle in the idle state is configured for the UE in the inactive state. In this way, a shorter system message update comparison cycle can be obtained. Accordingly, the UE in the inactive state monitors the messages so that the probability of monitoring a paging message, etc., can be increased. Moreover, since a shorter system message update comparison cycle is used as a basis for determining whether the system message update comparison cycle is longer than the system message update cycle in the example of the disclosure, in response to determining that a shorter system message update comparison cycle is longer than the system message update cycle, the updated system message is acquired based on an extended system message update cycle. Accordingly, a success rate of acquiring the updated system message can be further increased.

It needs to be noted that those skilled in the art can understand that the method according to the example of the disclosure may be executed alone or may be executed together with some methods in the example of the disclosure or some methods in the related art.

Figure 5:
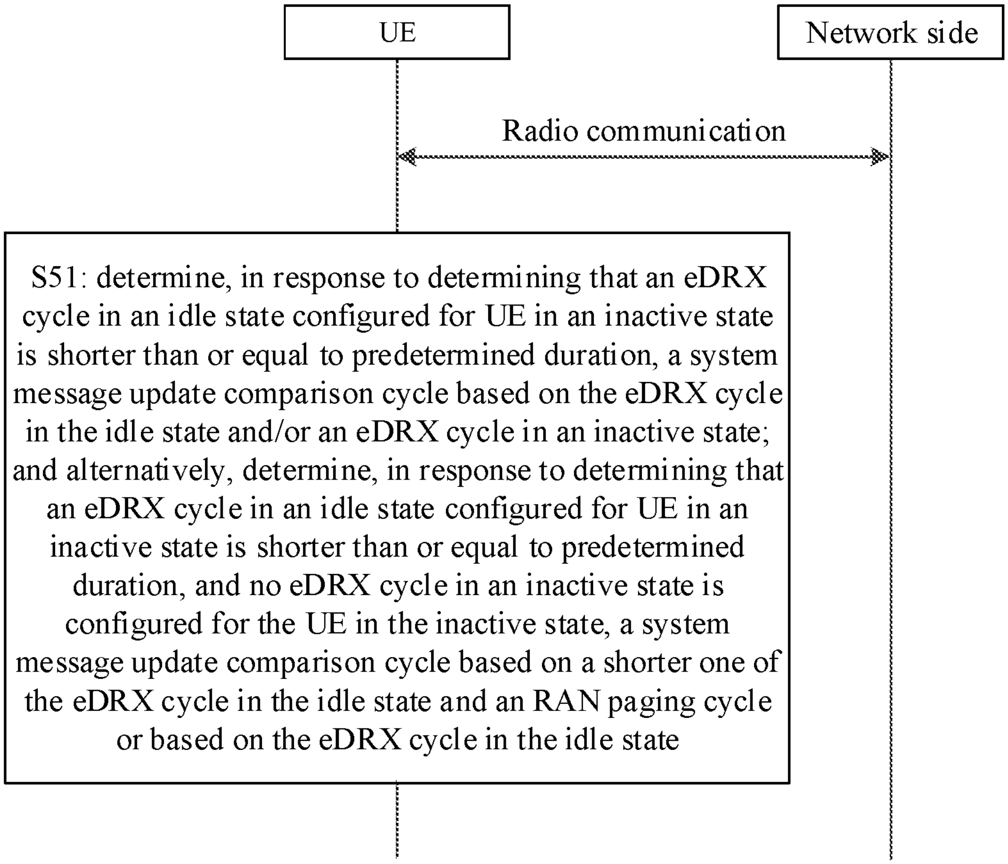
FIG. 5 is a schematic diagram of a method for processing information shown according to an example.

As shown in FIG. 5, a method for processing information is provided in an example of the disclosure. The method is performed by UE and includes:

S51: in response to determining that an eDRX cycle in an idle state configured for UE in an inactive state is shorter than or equal to predetermined duration, a system message update comparison cycle is determined based on the eDRX cycle in the idle state and/or an eDRX cycle in an inactive state; and alternatively, in response to determining that an eDRX cycle in an idle state configured for UE in an inactive state is shorter than or equal to predetermined duration, and no eDRX cycle in an inactive state is configured for the UE in the inactive state, a system message update comparison cycle is determined based on a shorter one of the eDRX cycle in the idle state and an RAN paging cycle or based on the eDRX cycle in the idle state.

In some examples, the step that a system message update comparison cycle is determined includes: in response to determining that the eDRX cycle in the idle state configured for the UE in the inactive state is shorter than or equal to the predetermined duration, the system message update comparison cycle is determined based on the eDRX cycle in the idle state and/or the eDRX cycle in the inactive state; and alternatively, in response to determining that the eDRX cycle in the idle state configured for the UE in the inactive state is shorter than or equal to the predetermined duration, and no eDRX cycle in the inactive state is configured for the UE in the inactive state, the system message update comparison cycle is determined based on a shorter one of the eDRX cycle in the idle state and the RAN paging cycle or based on the eDRX cycle in the idle state.

In some examples of the disclosure, the system message update comparison cycle may be the system message update comparison cycle in S31, which will not be repeated here.

In an example, the predetermined duration may be N times first duration. The first duration may be a DRX cycle here. For example, the DRX cycle may be 0.64 seconds, 1.28 seconds, 2.56 seconds, etc. X is greater than 1 here.

In an example, the predetermined duration is 10.24 seconds.

The method for processing information according to the example of the disclosure is performed by UE and may include: in response to determining that an eDRX cycle in an idle state configured for UE in an inactive state is shorter than or equal to the predetermined duration, a system message update comparison cycle is determined based on a shorter one of the eDRX cycle in the idle state and an eDRX cycle in an inactive state.

In an example, in response to determining that the eDRX cycle in the idle state configured for the UE in the inactive state is shorter than or equal to the predetermined duration, the system message update comparison cycle is a shorter one of the eDRX cycle in the idle state and the eDRX cycle in the inactive state. Illustratively, in response to determining that the eDRX cycle in the idle state is 10.24 seconds, and the eDRX cycle in the inactive state is 5.12 seconds, the eDRX cycle is the eDRX cycle in the inactive state, i.e., 5.12 seconds.

In another example, in response to determining that the eDRX cycle in the idle state configured for the UE in the inactive state is shorter than or equal to the predetermined duration, the system message update comparison cycle is a cycle spaced from a shorter one of the eDRX cycle in the idle state and the eDRX cycle in the inactive state by a predetermined value. Illustratively, in response to determining that the eDRX cycle in the idle state is 10.24 seconds, and the eDRX cycle in the inactive state is 5.12 seconds, the eDRX cycle is a cycle spaced from the eDRX cycle in the inactive state by a predetermined value, for example, any one of the values in a range from 5.0 seconds to 5.4 seconds.

Illustratively, in response to determining that the eDRX cycle in the idle state configured for the UE in the inactive state is at least one of 10.24 seconds, 5.12 seconds, or 2.56 seconds, and the eDRX cycle in the inactive state configured for the UE in the inactive state is at least one of 10.24 seconds, 5.12 seconds, or 2.56 seconds, the system message update comparison cycle is a shorter one of the eDRX cycle in the idle state and the eDRX cycle in the inactive state. In response to determining that the eDRX cycle in the idle state configured for the UE in the inactive state is 10.24 seconds, and the eDRX cycle in the inactive state configured for the UE in the inactive state is 10.24 seconds, the system message update comparison cycle is 10.24 seconds. In response to determining that the eDRX cycle in the idle state configured for the UE in the inactive state is 10.24 seconds, and the eDRX cycle in the inactive state configured for the UE in the inactive state is 5.12 seconds, the system message update comparison cycle is the eDRX cycle in the inactive state, i.e., 5.12 seconds. In response to determining that the eDRX cycle in the idle state configured for the UE in the inactive state is 10.24 seconds, and the eDRX cycle in the inactive state configured for the UE in the inactive state is 2.56 seconds, the system message update comparison cycle is the eDRX cycle in the inactive state, i.e., 2.56 seconds. In response to determining that the eDRX cycle in the idle state configured for the UE in the inactive state is 5.12 seconds, and the eDRX cycle in the inactive state configured for the UE in the inactive state is 10.24 seconds, the system message update comparison cycle is the eDRX cycle in the idle state, i.e., 5.12 seconds. In response to determining that the eDRX cycle in the idle state configured for the UE in the inactive state is 2.56 seconds, and the eDRX cycle in the inactive state configured for the UE in the inactive state is 10.24 seconds, the system message update comparison cycle is the eDRX cycle in the idle state, i.e., 2.56 seconds.

In this way, in response to determining that the eDRX cycle in the idle state shorter than or equal to the predetermined duration is configured for the UE in the inactive state, the system message update comparison cycle in the inactive state may be acquired based on a shorter one of the eDRX cycle and the eDRX cycle in the idle state in the example of the disclosure. In this way, a relatively shorter system message update comparison cycle can be obtained in the example of the disclosure. Accordingly, the UE monitors the message so that the probability of monitoring a paging message, etc., can be increased while the power consumption of the UE can be reduced.

The method for processing information according to the example of the disclosure is performed by UE and may include: in response to determining that an eDRX cycle in an idle state configured for UE in an inactive state is shorter than or equal to the predetermined duration, a system message update comparison cycle is determined based on an eDRX cycle in an inactive state.

In an example, in response to determining that the eDRX cycle in the idle state configured for the UE in the inactive state is shorter than or equal to the predetermined duration, the system message update comparison cycle is the eDRX cycle in the inactive state.

In another example, in response to determining that the eDRX cycle in the idle state configured for the UE in the inactive state is shorter than or equal to the predetermined duration, the system message update comparison cycle is a cycle spaced from the eDRX cycle in the inactive state by a predetermined value.

Illustratively, the eDRX cycle in the idle state configured for the UE in the inactive state is at least one of 10.24 seconds, 5.12 seconds, or 2.56 seconds, and the eDRX cycle in the inactive state configured for the UE in the inactive state is at least one of 10.24 seconds, 5.12 seconds, or 2.56 seconds, the system message update comparison cycle is the eDRX cycle in the inactive state. In response to determining that the eDRX cycle in the idle state configured for the UE in the inactive state is 10.24 seconds, and the eDRX cycle in the inactive state configured for the UE in the inactive state is 5.12 seconds, the system message update comparison cycle is the eDRX cycle in the inactive state, i.e., 5.12 seconds. In response to determining that the eDRX cycle in the idle state configured for the UE in the inactive state is 10.24 seconds, and the eDRX cycle in the inactive state configured for the UE in the inactive state is 2.56 seconds, the system message update comparison cycle is the eDRX cycle in the inactive state, i.e., 2.56 seconds. In response to determining that the eDRX cycle in the idle state configured for the UE in the inactive state is 5.12 seconds, and the eDRX cycle in the inactive state configured for the UE in the inactive state is 2.56 seconds, the system message update comparison cycle is the eDRX cycle in the inactive state, i.e., 2.56 seconds.

It can be understood that in the example of the disclosure, the eDRX cycle in the inactive state is typically shorter than the eDRX cycle in the idle state, the system message update comparison cycle may be determined based on a shorter eDRX cycle in the inactive state. Accordingly, the UE monitors the messages so that the probability of monitoring a paging message, etc. can be increased while energy consumption such as power consumption of the UE can be reduced. In response to determining that the eDRX cycle in the inactive state is not shorter than the eDRX cycle in the idle state, the eDRX cycle in the inactive state may also be determined based on the eDRX cycle in the idle state. Accordingly, the system message update comparison cycle better matching a current inactive state of the UE in the inactive state can be determined, and monitoring requirement of the UE in the inactive state UE can be further satisfied. In other examples, in response to determining that the eDRX cycle in the idle state configured for the UE in the inactive state is shorter than or equal to the predetermined duration, the system message update comparison cycle may also be determined based on the eDRX cycle in the idle state.

The method for processing information according to the example of the disclosure is performed by UE and may include: in response to determining that an eDRX cycle in an idle state configured for UE in an inactive state is shorter than or equal to the predetermined duration, and no eDRX cycle in an inactive state is configured for the UE in the inactive state, a system message update comparison cycle is determined based on a shorter one of the eDRX cycle in the idle state and an RAN paging cycle.

In an example, in response to determining that the eDRX cycle in the idle state configured for the UE in the inactive state is shorter than or equal to the predetermined duration, and no eDRX cycle in the inactive state is configured for the UE in the inactive state, the system message update comparison cycle is a shorter one of the eDRX cycle in the idle state and the RAN paging cycle. Illustratively, in response to determining that the eDRX cycle in the idle state is 10.24 seconds, and the RAN paging cycle is 5.12 seconds, the eDRX cycle is the RAN paging cycle, i.e., 5.12 seconds.

In another example, in response to determining that the eDRX cycle in the idle state configured for the UE in the inactive state is shorter than or equal to the predetermined duration, and no eDRX cycle in the inactive state is configured for the UE in the inactive state, the system message update comparison cycle is a cycle spaced from a shorter one of the eDRX cycle in the idle state and the RAN paging cycle by a predetermined value. Illustratively, in response to determining that the eDRX cycle in the idle state is 10.24 seconds, and the RAN paging cycle is 5.12 seconds, the eDRX cycle is a cycle spaced from the RAN paging cycle by a predetermined value, for example, any one of the values in a range from 5.0 seconds to 5.4 seconds.

Illustratively, in response to determining that the eDRX cycle in the idle state configured for the UE in the inactive state is at least one of 10.24 seconds, 5.12 seconds, or 2.56 seconds, and no eDRX cycle in the inactive state is configured for the UE in the inactive state, the system message update comparison cycle is a shorter one of the eDRX cycle in the idle state and the RAN paging cycle. In response to determining that the eDRX cycle in the idle state of the UE in the inactive state is shorter than or equal to the RAN paging cycle, the system message update comparison cycle is the eDRX cycle in the idle state. In response to determining that the eDRX cycle in the idle state of the UE in the inactive state is longer than the RAN paging cycle, the system message update comparison cycle is the RAN paging cycle.

In this way, in response to determining that the eDRX cycle in the idle state is shorter than or equal to the predetermined duration instead of the eDRX cycle in the inactive state is configured for the UE in the inactive state, the UE in the inactive state may determine the system message update comparison cycle based on a shorter one of the eDRX cycle in the idle state and the RAN paging cycle in the example of the disclosure. In this way, the UE monitors the messages so that the probability of monitoring a paging message, etc., can be increased while energy consumption, such as power consumption of the UE, can be reduced.

In some examples, the step that, in response to determining that an eDRX cycle in an idle state configured for UE in an inactive state is shorter than or equal to the predetermined duration, a system message update comparison cycle based on the eDRX cycle in the idle state and/or an eDRX cycle in an inactive state includes one of the following:

in response to determining that the eDRX cycle in the idle state configured for the UE in the inactive state is shorter than or equal to the predetermined duration, the system message update comparison cycle is determined based on a shorter one of the eDRX cycle in the idle state and/or the eDRX cycle in the inactive state; and alternatively, in response to determining that the eDRX cycle in the idle state configured for the UE in the inactive state is shorter than or equal to the predetermined duration, the system message update comparison cycle is determined based on the eDRX cycle in the inactive state.

In the example of the disclosure, in response to determining that the eDRX cycle shorter than or equal to the predetermined duration is configured for the UE in the inactive state, the system message update comparison cycle may be determined based on a shorter one of the eDRX cycle in the idle state and the eDRX cycle in the inactive state. Accordingly, the probability of monitoring a paging message, etc., can be increased while power consumption of the UE can be reduced. Alternatively, in response to determining that the eDRX cycle shorter than or equal to the predetermined duration instead of the eDRX cycle in the inactive state is configured for the UE in the inactive state, the UE in the inactive state may determine the system message update comparison cycle based on a minimum of the eDRX cycle in the idle state and the RAN paging cycle. Accordingly, the probability of monitoring a paging message, etc., can be increased while power consumption of the UE can be reduced.

Moreover, in response to determining that the eDRX cycle in the idle state configured for the UE in the inactive state is shorter than or equal to the predetermined duration, the system message update comparison cycle is determined based on a shorter one of the eDRX cycle in the inactive state, the eDRX cycle in the idle state, and the RAN paging cycle in the example of the disclosure. That is, a shorter system message update comparison cycle may be used as a basis for determining whether the system message update comparison cycle is longer than a system message update cycle. In this way, under the condition that a shorter system message update comparison cycle is also longer than the system message update cycle, an extended system message update cycle is required. The updated system message can be acquired further accurately according to the extended system message update cycle.

It needs to be noted that those skilled in the art can understand that the method according to the example of the disclosure may be executed alone or may be executed together with some methods in the example of the disclosure or some methods in the related art.

Figure 6:
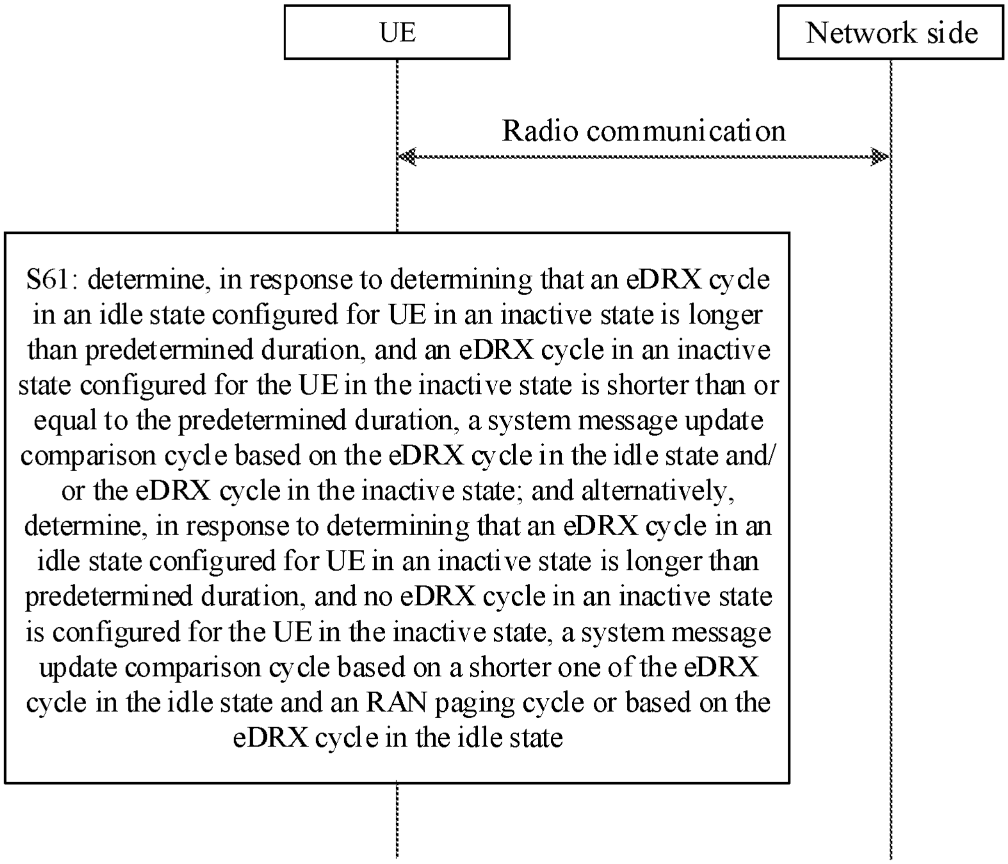
FIG. 6 is a schematic diagram of a method for processing information shown according to an example.

As shown in FIG. 6, a method for processing information is provided in an example of the disclosure. The method is performed by UE and includes:

S61: in response to determining that an eDRX cycle in an idle state configured for UE in an inactive state is longer than predetermined duration, and an eDRX cycle in an inactive state configured for the UE in the inactive state is shorter than or equal to the predetermined duration, a system message update comparison cycle is determined based on the eDRX cycle in the idle state and/or the eDRX cycle in the inactive state; and alternatively, in response to determining that an eDRX cycle in an idle state configured for UE in an inactive state is longer than predetermined duration, and no eDRX cycle in an inactive state is configured for the UE in the inactive state, a system message update comparison cycle is determined based on a shorter one of the eDRX cycle in the idle state and an RAN paging cycle or based on the eDRX cycle in the idle state.

In some examples, the step that a system message update comparison cycle of the UE in the inactive state is determined includes: in response to determining that the eDRX cycle in the idle state configured for the UE in the inactive state is longer than the predetermined duration, and the eDRX cycle in the inactive state configured for the UE in the inactive state is shorter than or equal to the predetermined duration, the system message update comparison cycle is determined based on the eDRX cycle in the idle state and/or the eDRX cycle in the inactive state; and alternatively, in response to determining that the eDRX cycle in the idle state configured for the UE in the inactive state is longer than the predetermined duration, and no eDRX cycle in the inactive state is configured for the UE in the inactive state, the system message update comparison cycle is determined based on a shorter one of the eDRX cycle in the idle state and the RAN paging cycle or based on the eDRX cycle in the idle state.

In some examples of the disclosure, the system message update comparison cycle may be the system message update comparison cycle in S31, and the predetermined duration may be the predetermined duration in S51, which will not be repeated here.

The method for processing information according to the example of the disclosure is performed by UE and may include: in response to determining that an eDRX cycle in an idle state configured for UE in an inactive state is longer than predetermined duration, and an eDRX cycle in an inactive state configured for the UE in the inactive state is shorter than or equal to the predetermined duration, a system message update comparison cycle is determined based on a shorter one of the eDRX cycle in the idle state and the eDRX cycle in the inactive state.

In an example, in response to determining that the eDRX cycle in the idle state configured for the UE in the inactive state is longer than the predetermined duration, and the eDRX cycle in the inactive state configured for the UE in the inactive state is shorter than or equal to the predetermined duration, the system message update comparison cycle is a shorter one of the eDRX cycle in the idle state and the eDRX cycle in the inactive state. Illustratively, in response to determining that the eDRX cycle in the idle state is 10.24 seconds, and the eDRX cycle in the inactive state is 5.12 seconds, the eDRX cycle is the eDRX cycle in the inactive state, i.e., 5.12 seconds.

In another example, in response to determining that the eDRX cycle in the idle state configured for the UE in the inactive state is longer than the predetermined duration, and the eDRX cycle in the inactive state configured for the UE in the inactive state is shorter than or equal to the predetermined duration, the system message update comparison cycle is a cycle spaced from a shorter one of the eDRX cycle in the idle state and the eDRX cycle in the inactive state by a predetermined value. Illustratively, in response to determining that the eDRX cycle in the idle state is 10.24 seconds, and the eDRX cycle in the inactive state is 5.12 seconds, the eDRX cycle is a cycle spaced from the eDRX cycle in the inactive state by a predetermined value, for example, any one of the values in a range from 5.0 seconds to 5.4 seconds.

Illustratively, in response to determining that the eDRX cycle in the idle state configured for the UE in the inactive state is longer than 10.24 seconds, and the eDRX cycle in the inactive state configured for the UE in the inactive state is at least one of 10.24 seconds, 5.12 seconds, or 2.56 seconds, the system message update comparison cycle is determined as a shorter one of the eDRX cycle in the idle state and the eDRX cycle in the inactive state. In response to determining that the eDRX cycle in the idle state configured for the UE in the inactive state is 20.48 seconds, and the eDRX cycle in the inactive state configured for the UE in the inactive state is 10.24 seconds, the system message update comparison cycle is the eDRX cycle in the inactive state, i.e., 10.24 seconds. In response to determining that the eDRX cycle in the idle state configured for the UE in the inactive state is 20.48 seconds, and the eDRX cycle in the inactive state configured for the UE in the inactive state is 5.12 seconds, the system message update comparison cycle is the eDRX cycle in the inactive state, i.e., 5.12 seconds. In response to determining that the eDRX cycle in the idle state configured for the UE in the inactive state is 20.48 seconds, and the eDRX cycle in the inactive state configured for the UE in the inactive state is 2.56 seconds, the system message update comparison cycle is the eDRX cycle in the inactive state, i.e., 2.56 seconds.

In this way, in response to determining that the eDRX cycle in the idle state longer than the predetermined duration and the eDRX cycle shorter than or equal to the predetermined duration are configured for the UE in the inactive state, the system message update comparison cycle in the inactive state is acquired based on a shorter one of the eDRX cycle and the eDRX cycle in the idle state in the example of the disclosure. In this way, a shorter system message update comparison cycle can be obtained in the example of the disclosure. Accordingly, the probability of monitoring a paging message, etc., can be increased while energy consumption such, as power consumption, can be reduced.

It can be understood that since the eDRX cycle in the idle state configured for the UE in the inactive state is longer than the predetermined duration, and the eDRX cycle in the inactive state configured for the UE in the inactive state is shorter than or equal to the predetermined duration, the eDRX cycle in the idle state is typically longer than the eDRX cycle in the inactive state, and the system message update comparison cycle is determined based on the eDRX cycle in the inactive state.

For example, the method for processing information according to the example of the disclosure is performed by UE and may include: in response to determining that an eDRX cycle in an idle state configured for UE in an inactive state is longer than the predetermined duration, and an eDRX cycle in an inactive state configured for the UE in the inactive state is shorter than or equal to the predetermined duration, a system message update comparison cycle is determined based on the eDRX cycle in the inactive state. The system message update comparison cycle is the eDRX cycle in the inactive state or a cycle spaced from the eDRX cycle in the inactive state by a predetermined value.

The method for processing information according to the example of the disclosure is performed by UE and may include: in response to determining that an eDRX cycle in an idle state configured for UE is in an inactive state is longer than the predetermined duration, and an eDRX cycle in an inactive state configured for the UE in the inactive state is shorter than or equal to the predetermined duration, a system message update comparison cycle is determined based on the eDRX cycle in the idle state.

In an example, in response to determining that the eDRX cycle in the idle state configured for the UE in the inactive state is longer than the predetermined duration, and the eDRX cycle in the inactive state configured for the UE in the inactive state is shorter than or equal to the predetermined duration, the system message update comparison cycle is the eDRX cycle in the idle state. Illustratively, in response to determining that the eDRX cycle in the idle state is 10.24 seconds, and the eDRX cycle in the inactive state is 5.12 seconds, the eDRX cycle is the eDRX cycle in the idle state, i.e., 10.24 seconds.

In another example, in response to determining that the eDRX cycle in the idle state configured for the UE in the inactive state is shorter than or equal to the predetermined duration, the system message update comparison cycle is a cycle spaced from the eDRX cycle in the idle state by a predetermined value. Illustratively, in response to determining that the eDRX cycle in the idle state is 10.24 seconds, and the eDRX cycle in the inactive state is 5.12 seconds, the eDRX cycle is a cycle spaced from the eDRX cycle in the idle state by a predetermined value, for example, any one of the values in a range from 10 seconds to 10.5 seconds.

Illustratively, in response to determining that the eDRX cycle in the idle state configured for the UE in the inactive state is longer than 10.24 seconds, and the eDRX cycle in the inactive state configured for the UE in the inactive state is at least one of 10.24 seconds, 5.12 seconds, or 2.56 seconds, the system message update comparison cycle is the eDRX cycle in the idle state. In response to determining that the eDRX cycle in the idle state configured for the UE in the inactive state is 20.48 seconds, and the eDRX cycle in the inactive state configured for the UE in the inactive state is 10.24 seconds, the system message update comparison cycle is the eDRX cycle in the idle state, i.e., 20.48 seconds. In response to determining that the eDRX cycle in the idle state configured for the UE in the inactive state is 20.48 seconds, and the eDRX cycle in the inactive state configured for the UE in the inactive state is 5.12 seconds, the system message update comparison cycle is the eDRX cycle in the idle state, i.e., 20.48 seconds. In response to determining that the eDRX cycle in the idle state configured for the UE in the inactive state is 20.48 seconds, and the eDRX cycle in the inactive state configured for the UE in the inactive state is 2.56 seconds, the system message update comparison cycle is the eDRX cycle in the idle state, i.e., 20.48 seconds.

In this way, in response to determining that the eDRX cycle in the idle state longer than the predetermined duration and the eDRX cycle shorter than or equal to the predetermined duration are configured for the UE in the inactive state, the system message update comparison cycle is determined based on the eDRX cycle in the idle state in the example of the disclosure. Thus, the method can be adapted to more application scenarios for determining the system message update comparison cycle. Moreover, since a longer eDRX cycle in the idle state is selected as the system message update comparison cycle, the UE can monitor the messages at a longer time interval, so that the power consumption of the UE can be further reduced.

In some examples, the step that in response to determining that an eDRX cycle in an idle state configured for UE in an inactive state is longer than the predetermined duration, and an eDRX cycle in an inactive state configured for the UE in the inactive state is shorter than or equal to the predetermined duration, a system message update comparison cycle is determined based on the eDRX cycle in the idle state and/or the eDRX cycle in the inactive state includes one of the following:

in response to determining that the eDRX cycle in the idle state configured for the UE in the inactive state is longer than the predetermined duration, and the eDRX cycle in the inactive state configured for the UE in the inactive state is shorter than or equal to the predetermined duration, the system message update comparison cycle is determined based on a shorter one of the eDRX cycle in the idle state and the eDRX cycle in the inactive state; alternatively, in response to determining that the eDRX cycle in the idle state configured for the UE in the inactive state is longer than the predetermined duration, and the eDRX cycle in the inactive state configured for the UE in the inactive state is shorter than or equal to the predetermined duration, the system message update comparison cycle is determined based on the eDRX cycle in the inactive state; and alternatively, in response to determining that the eDRX cycle in the idle state configured for the UE in the inactive state is longer than the predetermined duration, and the eDRX cycle in the inactive state configured for the UE in the inactive state is shorter than or equal to the predetermined duration, the system message update comparison cycle is determined based on the eDRX cycle in the idle state.

The method for processing information according to the example of the disclosure is performed by UE and may include: in response to determining that an eDRX cycle in an idle state configured for UE in an inactive state is longer than the predetermined duration, and no eDRX cycle in an inactive state is configured for the UE in the inactive state, a system message update comparison cycle is determined based on the eDRX cycle in the idle state.

In an example, in response to determining that the eDRX cycle in the idle state configured for the UE in the inactive state is longer than the predetermined duration, and no eDRX cycle in the inactive state is configured for the UE in the inactive state, the system message update comparison cycle is the eDRX cycle in the idle state. Illustratively, in response to determining that the eDRX cycle in the idle state configured for the UE in the inactive state is 20.48 seconds, and no eDRX cycle in the inactive state is configured for the UE in the inactive state, the eDRX cycle is 20.48 seconds.

In another example, in response to determining that the eDRX cycle in the idle state configured for the UE in the inactive state is longer than the predetermined duration, and no eDRX cycle in the inactive state is configured for the UE in the inactive state, the system message update comparison cycle is a cycle spaced from of the eDRX cycle in the idle state by a predetermined value. Illustratively, in response to determining that the eDRX cycle in the idle state configured for the UE in the inactive state is 20.48 seconds, and no eDRX cycle in the inactive state is configured for the UE in the inactive state, the eDRX cycle is a cycle spaced from the eDRX cycle in the idle state by a predetermined value, for example, any one of the values in a range from 20 seconds to 28 seconds.

In this way, in response to determining that the eDRX cycle is in the idle state longer than the predetermined duration instead of the eDRX cycle in the inactive state is configured for the UE in the inactive state, the UE in the inactive state may determine the system message update comparison cycle based on the eDRX cycle in the idle state directly in the example of the disclosure. In this way, in response to determining that no eDRX cycle in the inactive state is configured for the UE in the inactive state, the UE in the inactive state may perform paging monitoring through the eDRX cycle in the idle state that is close to the inactive state, so as to obtain an appropriate system message update comparison cycle. Moreover, the probability of monitoring a paging message, etc., can be increased while power consumption of the UE can be reduced.

The method for processing information according to the example of the disclosure is performed by UE and may include: in response to determining that an eDRX cycle in an idle state configured for UE in an inactive state is longer than predetermined duration, and no eDRX cycle in an inactive state is configured for the UE in the inactive state, a system message update comparison cycle is determined based on a shorter one of the eDRX cycle in the idle state and an RAN paging cycle.

In an example, in response to determining that the eDRX cycle in the idle state configured for the UE in the inactive state is longer than the predetermined duration, and no eDRX cycle in the inactive state is configured for the UE in the inactive state, the system message update comparison cycle is a shorter one of the eDRX cycle in the idle state and the RAN paging cycle. Illustratively, in response to determining that the eDRX cycle in the idle state is 20.48 seconds, and the RAN paging cycle is 5.12 seconds, the eDRX cycle is the RAN paging cycle, i.e., 5.12 seconds.

In another example, in response to determining that the eDRX cycle in the idle state configured for the UE in the inactive state is longer than the predetermined duration, and no eDRX cycle in the inactive state is configured for the UE in the inactive state, the system message update comparison cycle is a cycle spaced from a shorter one of the eDRX cycle in the idle state and the RAN paging cycle by a predetermined value. Illustratively, in response to determining that the eDRX cycle in the idle state is 20.48 seconds, and the RAN paging cycle is 5.12 seconds, the eDRX cycle is a cycle spaced from the RAN paging cycle by a predetermined value, for example, any one of the values in a range from 5.0 seconds to 5.4 seconds.

Illustratively, in response to determining that the eDRX cycle in the idle state configured for the UE in the inactive state is 20.48 seconds, and no eDRX cycle in the inactive state is configured for the UE in the inactive state, the system message update comparison cycle is a shorter one of the eDRX cycle in the idle state and the RAN paging cycle. In response to determining that the eDRX cycle in the idle state of the UE in the inactive state is shorter than or equal to the RAN paging cycle, the system message update comparison cycle is the eDRX cycle in the idle state. In response to determining that the eDRX cycle in the idle state of the UE in the inactive state is longer than the RAN paging cycle, the system message update comparison cycle is the RAN paging cycle.

In this way, in response to determining that the eDRX cycle is in the idle state longer than the predetermined duration instead of the eDRX cycle in the inactive state is configured for the UE in the inactive state, the UE in the inactive state may determine the system message update comparison cycle based on a shorter one of the eDRX cycle in the idle state and the RAN paging cycle. In this way, the UE monitors the messages so that the probability of monitoring a paging message, etc., can be increased while energy consumption, such as power consumption of the UE can be reduced.

In an example, the step that a system message update comparison cycle of UE in an inactive state is determined includes one of the following:

- in response to determining that the eDRX cycle in the idle state configured for the UE in the inactive state is longer than the predetermined duration, and no eDRX cycle in the inactive state is configured for the UE in the inactive state, the eDRX cycle of the UE in the inactive state is determined based on the eDRX cycle in the idle state; and alternatively,
- in response to determining that the eDRX cycle in the idle state configured for the UE in the inactive state is longer than the predetermined duration, and no eDRX cycle in the inactive state is configured for the UE in the inactive state, the eDRX cycle of the UE in the inactive state is determined based on a shorter one of the eDRX cycle in the idle state and the RAN paging cycle.

In an example of the disclosure, in response to determining that the eDRX cycle in the idle state longer than the predetermined duration and the eDRX cycle in the inactive state shorter than or equal to the predetermined duration are configured for the UE in the inactive state, the system message update comparison cycle may be determined based on a shorter eDRX cycle in the inactive state. In this way, the probability of monitoring a paging message, etc., can be increased while energy consumption of the UE can be reduced. Moreover, a shorter one may be used as a basis for determining whether a shorter one is longer than the system message update cycle. In this way, under the condition that a shorter system message update comparison cycle is longer than the system message update cycle, and the updated system message can be acquired further accurately through an extended system message update cycle. Alternatively, the system message update comparison cycle may also be determined based on the eDRX cycle in the idle state. In this way, the method can be adapted to more application scenarios for determining the eDRX cycle of the UE in the inactive state, and the UE can be woken up for monitoring the message at a long time interval, so that the power consumption of the UE can be further reduced.

Alternatively, in response to determining that the eDRX cycle is in the idle state longer than the predetermined duration instead of the eDRX cycle in the inactive state is configured for the UE in the inactive state, the system message update comparison cycle may be determined based on the eDRX cycle in the idle state or a minimum of the eDRX cycle in the idle state and the RAN paging cycle directly. In this way, the probability of monitoring a paging message, etc., can be increased while energy consumption such as power consumption of the UE can be reduced.

It need to be noted that those skilled in the art can understand that the method according to the example of the disclosure may be executed alone or may be executed together with some methods in the example of the disclosure or some methods in the related art.

Figure 7:
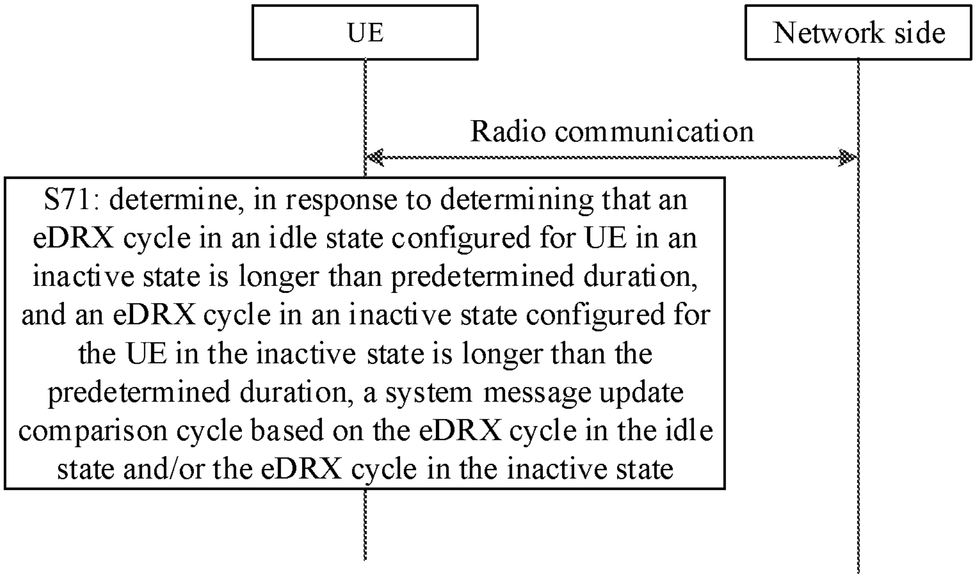
FIG. 7 is a schematic diagram of a method for processing information shown according to an example.

As shown in FIG. 7, a method for processing information is provided in an example of the disclosure. The method is performed by UE and includes:

S71: in response to determining that an eDRX cycle in an idle state configured for UE in an inactive state is longer than the predetermined duration, and an eDRX cycle in an inactive state configured for the UE in the inactive state is longer than the predetermined duration, a system message update comparison cycle is determined based on the eDRX cycle in the idle state and/or the eDRX cycle in the inactive state.

In some examples, the step that a system message update comparison cycle is determined includes: in response to determining that the eDRX cycle in the idle state configured for the UE in the inactive state is longer than the predetermined duration, and the eDRX cycle in the inactive state configured for the UE in the inactive state is longer than the predetermined duration, the system message update comparison cycle is determined based on the eDRX cycle in the idle state and/or the eDRX cycle in the inactive state.

In some examples of the disclosure, the system message update comparison cycle may be the system message update comparison cycle in S31, and the predetermined duration may be the predetermined duration in S51, which will not be repeated here.

The method for processing information according to the example of the disclosure is performed by UE and may include: in response to determining that an eDRX cycle in an idle state configured for UE is in an inactive state is longer than predetermined duration, and an eDRX cycle in an inactive state configured for the UE in the inactive state is longer than the predetermined duration, a system message update comparison cycle is determined based on a shorter one of the eDRX cycle in the idle state and the eDRX cycle in the inactive state.

In an example, in response to determining that the eDRX cycle in the idle state configured for the UE in the inactive state is longer than the predetermined duration, and the eDRX cycle in the inactive state configured for the UE in the inactive state is longer than the predetermined duration, the system message update comparison cycle is a shorter one of the eDRX cycle in the idle state and the eDRX cycle in the inactive state. Illustratively, in response to determining that the eDRX cycle in the idle state is 30.72 seconds, and the eDRX cycle in the inactive state is 20.48 seconds, the eDRX cycle is the eDRX cycle in the inactive state, i.e., 20.48 seconds.

In another example, in response to determining that the eDRX cycle in the idle state configured for the UE in the inactive state is longer than the predetermined duration, and the eDRX cycle in the inactive state configured for the UE in the inactive state is longer than the predetermined duration, the system message update comparison cycle is a cycle spaced from a shorter one of the eDRX cycle in the idle state and the eDRX cycle in the inactive state by a predetermined value. Illustratively, in response to determining that the eDRX cycle in the idle state is 30.72 seconds, and the eDRX cycle in the inactive state is 20.48 seconds, the eDRX cycle is a cycle spaced from the eDRX cycle in the inactive state by a predetermined value, for example, any one of the values in a range from 20 seconds to 20.6 seconds.

Illustratively, in response to determining that the eDRX cycle in the idle state configured for the UE in the inactive state is longer than 10.24 seconds, and the eDRX cycle in the inactive state configured for the UE in the inactive state is longer than 10.24 seconds, in response to determining that the eDRX cycle in the idle state is longer than or equal to the eDRX cycle in the inactive state, the system message update comparison cycle of the UE in the inactive state is determined based on the eDRX cycle in the idle state; and when the eDRX cycle in the idle state is shorter than the eDRX cycle in the inactive state, the system message update comparison cycle of the UE in the inactive state is determined based on the eDRX cycle in the inactive state.

In this way, an extended eDRX cycle of the UE in the inactive state may be acquired based on a shorter system message update comparison cycle in the example of the disclosure. Accordingly, the probability of monitoring a paging message, etc., can be increased while energy consumption, such as power consumption, can be reduced.

The method for processing information according to the example of the disclosure is performed by UE and may include: in response to determining that an eDRX cycle in an idle state configured for UE in an inactive state is longer than the predetermined duration, and an eDRX cycle in an inactive state configured for the UE in the inactive state is longer than the predetermined duration, a system message update comparison cycle is determined based on the eDRX cycle in the inactive state. The eDRX cycle may be the eDRX cycle in the inactive state or a cycle spaced from the eDRX cycle in the inactive state by a predetermined value here.

Illustratively, in response to determining that the eDRX cycle in the idle state configured for the UE in the inactive state is 30.72 seconds, and the eDRX cycle in the inactive state configured for UE in an inactive state is 20.48 seconds, the system message update comparison cycle is an eDRX cycle in an inactive state, i.e., 20.48 seconds. In response to determining that the eDRX cycle in the idle state configured for the UE in the inactive state is 20.48 seconds, and the eDRX cycle in the inactive state configured for UE in an inactive state is 30.72 seconds, the system message update comparison cycle is an eDRX cycle in an inactive state, i.e., 30.72 seconds.

In this way, in the example of the disclosure, the system message update comparison cycle may be determined based on the eDRX cycle in the inactive state directly. In this way, since the eDRX cycle in the inactive state is typically shorter than the eDRX cycle in the idle state, a shorter system message update comparison cycle of the UE in the inactive state may be determined. Moreover, the eDRX cycle in the inactive state may be configured for the UE in the inactive state, so that paging requirements are further satisfied.

The method for processing information according to the example of the disclosure is performed by UE and may include: in response to determining that an eDRX cycle in an idle state configured for UE in an inactive state is longer than the predetermined duration, and an eDRX cycle in an inactive state configured for the UE in the inactive state is longer than the predetermined duration, a system message update comparison cycle is determined based on the eDRX cycle in the idle state. The eDRX cycle may be the eDRX cycle in the idle state or a cycle spaced from the eDRX cycle in the idle state by a predetermined value here.

Illustratively, in response to determining that the eDRX cycle in the idle state configured for the UE in the inactive state is 30.72 seconds, and the eDRX cycle in the inactive state configured for UE in an inactive state is 20.48 seconds, the system message update comparison cycle is the eDRX cycle in the idle state, i.e., 30.72 seconds. In response to determining that the eDRX cycle in the idle state configured for the UE in the inactive state is 20.48 seconds, and the eDRX cycle in the inactive state configured for UE in an inactive state is 30.72 seconds, the system message update comparison cycle is the eDRX cycle in the idle state, i.e., 20.48 seconds.

In this way, the system message update comparison cycle may be determined based on the eDRX cycle in the idle state directly in the example of the disclosure. In this way, the method is adapted to more application scenarios for determining the system message update comparison cycle, and a longer cycle may be determined as the system message update comparison cycle, so that the power consumption of the UE can be further reduced.

In some examples, the step that in response to determining that an eDRX cycle in an idle state configured for UE in an inactive state is longer than the predetermined duration, and an eDRX cycle in an inactive state configured for the UE in the inactive state is longer than the predetermined duration, a system message update comparison cycle is determined based on the eDRX cycle in the idle state and/or the eDRX cycle in the inactive state includes one of the following:

in response to determining that the eDRX cycle in the idle state configured for the UE in the inactive state is longer than the predetermined duration, and the eDRX cycle in the inactive state configured for the UE in the inactive state is longer than the predetermined duration, the system message update comparison cycle is determined based on a shorter one of the eDRX cycle in the idle state and the eDRX cycle in the inactive state; alternatively, in response to determining that the eDRX cycle in the idle state configured for the UE in the inactive state is longer than the predetermined duration, and the eDRX cycle in the inactive state configured for the UE in the inactive state is longer than the predetermined duration, the system message update comparison cycle is determined based on the eDRX cycle in the inactive state; and alternatively, in response to determining that the eDRX cycle in the idle state configured for the UE in the inactive state is longer than the predetermined duration, and the eDRX cycle in the inactive state configured for the UE in the inactive state is longer than the predetermined duration, the system message update comparison cycle is determined based on the eDRX cycle in the idle state.

In the example of the disclosure, in response to determining that the eDRX cycle in the idle state longer than the predetermined duration and the eDRX cycle in the inactive state longer than the predetermined duration are configured for the UE in the inactive state, the system message update comparison cycle may be determined based on a shorter one of the eDRX cycle in the idle state and the eDRX cycle in the inactive state. In this way, the probability of monitoring a paging message, etc., can be increased while energy consumption of the UE can be reduced. Moreover, a shorter system message update comparison cycle may be used as a basis for determining whether a shorter system message update comparison cycle is longer than the system message update cycle. In this way, under the condition that a shorter system message update comparison cycle is longer than the system message update cycle, the updated system message can be acquired more accurately according to an extended system message update cycle. Alternatively, when the system message update comparison cycle is determined based on the eDRX cycle in the inactive state, a system message update comparison cycle in an inactive state may be configured for the UE in the inactive state, so that paging requirements can be further satisfied. Alternatively, the system message update comparison cycle may be determined based on the eDRX cycle in the idle state. The method can be adapted to more application scenarios for determining the system message update comparison cycle, and the power consumption of the UE can be further reduced.

It needs to be noted that those skilled in the art can understand that the method according to the example of the disclosure may be executed alone or may be executed together with some methods in the example of the disclosure or some methods in the related art.

Figure 8:
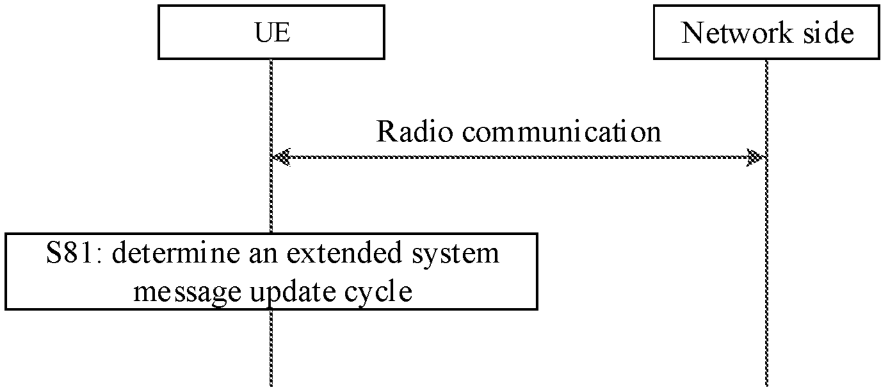
FIG. 8 is a schematic diagram of a method for processing information shown according to an example.

As shown in FIG. 8, a method for processing information is provided in an example of the disclosure. The method is performed by UE and includes:

S81: an extended system message update cycle is determined.

In some examples of the disclosure, the extended system message update cycle may be the extended system message update cycle in S31, which will not be repeated here.

The method for processing information according to the example of the disclosure is performed by UE and may include: the extended system message update cycle is determined based on a network configuration or a specification in a communication protocol.

In an example, the communication protocol may be, but is not limited to, a standard communication protocol. For example, the communication protocol may be a standard 5G communication protocol or a standard 4G communication protocol.

In an example, the network configuration may be, but is not limited to, a radio access network configuration or a core network configuration. For example, the network configuration may be configured by the base station of the radio access network.

In an example, the extended system message update cycle may be N times the system message update cycle, where N is a real number or integer greater than 1.

Illustratively, a system frame number (SFN) is 10 ms. The extended system message update cycle is longer than or equal to duration of 256 SFNs or 1024 SFNs.

Illustratively, a hyper frame number (H-SFN) corresponds to 1024 SFNs. The extended system message update cycle may be longer than the duration of one H-SFN.

The method for processing information according to the example of the disclosure, is performed by UE and may include: an extended system message update cycle is determined based on a type of UE in an inactive state. For example, a reduced capability (Redcap) user may be configured with a longer extended system message update cycle than an enhanced mobile broadband (eMBB) user.

Illustratively, in response to determining the UE in the inactive state is UE of a first type, the extended system message update cycle is longer than the first duration; and in response to determining that the UE in the inactive state is UE of a second type, the extended system message update cycle is shorter than the second duration. The number of services to be processed by the UE of the first type within a predetermined time range is greater than that of services to be processed by the UE of the second type within the predetermined time range. The first duration is longer than the second duration.

In some examples, S81 includes at least one of the following:

- the extended system message update cycle is determined based on the network configuration or the specification in the communication protocol; or
- the extended system message update cycle is determined based on the type of the UE in the inactive state.

In the example of the disclosure, the extended system message update cycle may be determined in various ways, including the network configuration or the specification in the communication protocol, and thus the method can be adapted to determine the extended system message update cycle under various scenarios. Moreover, the UE in the inactive state can acquire an updated system message at an appropriate timing.

Moreover, in the example of the disclosure, different extended system message update cycles may be determined for UE of different types based on types of the UE in the inactive state. Alternatively, a particular extended system message update cycle may be determined for UE in an inactive state of a particular type. Thus, a different UE in the inactive state can acquire the updated system message accurately at the appropriate timing.

It needs to be noted that those skilled in the art can understand that the method according to the example of the disclosure may be executed alone or may be executed together with some methods in the example of the disclosure or some methods in the related art.

The specific examples are further provided below in order to further describe the examples of the disclosure.

In an example, the system message update comparison cycle is a cycle that may be configured to be compared with the system message update cycle. The system message update cycle may be configured to determine a system message update behavior of the UE in the inactive state. The system message update comparison cycle may be derived from a DRX cycle configured for the UE.

Some examples that are configured to determine system message update comparison cycles under different DRX or different eDRX configuration scenarios are provided below.

In an example, the system message update comparison cycle is determined based on a cycle parameter, where the cycle parameter may be directly used as the system message update comparison cycle. In the example, the cycle parameter may be compared with the system message update cycle to determine a subsequent system message update behavior of the UE.

In another example, the system message update comparison cycle may be a discontinuous reception (DRX) cycle or an extended discontinuous reception (eDRX) cycle, or may be determined through the DRX cycle or the eDRX cycle.

In an example, the system message update comparison cycle may be the eDRX cycle in the idle state, or may be determined through the eDRX cycle in the idle state.

In an example, the system message update comparison cycle may be the eDRX cycle in the inactive state, or may be determined through the eDRX cycle in the inactive state.

In an example, the system message update comparison cycle may be a shorter one of the eDRX cycle in the idle state and the eDRX cycle in the inactive state, or may be determined through a shorter one of the eDRX cycle in the idle state and the eDRX cycle in the inactive state.

In an example, the system message update comparison cycle may be a shorter one of the eDRX cycle in the idle state and an RAN paging cycle, or may be determined through a shorter one of the eDRX cycle in the idle state and an RAN paging cycle.

In an example, the system message update comparison cycle may be a minimum of a UE-specific paging cycle, a default paging cycle, and an RAN paging cycle, or may be determined through a minimum of a UE-specific paging cycle, a default paging cycle, and an RAN paging cycle.

In an example, the condition that the eDRX cycle is configured for the UE in the inactive state may indicate one of the following: the eDRX cycle in the idle state is configured for the UE in the inactive state; and alternatively, the eDRX cycle in the idle state and the eDRX cycle in the inactive state are configured for the UE in the inactive state.

The condition that the eDRX cycle in the idle state is configured for the UE in the inactive state may also indicate one of the following: the eDRX cycle in the idle state configured for the UE in the inactive state is shorter than or equal to 10.24 seconds, and no eDRX cycle in the inactive state is configured for the UE in the inactive state; and alternatively, the eDRX cycle in the idle state configured for the UE in the inactive state is longer than 10.24 seconds, and no eDRX cycle in the inactive state is configured for the UE in the inactive state.

The condition that the eDRX cycle in the idle state and the eDRX cycle in the inactive state are configured for the UE in the inactive state may indicate one of the following: the eDRX cycle in the idle state and the eDRX cycle in the inactive state configured for the UE in the inactive state are shorter than or equal to 10.24 seconds; the eDRX cycle in the idle state configured for the UE in the inactive state is longer than 10.24 seconds, and the eDRX cycle in the inactive state configured for the UE in the inactive state is shorter than or equal to 10.24 seconds; and alternatively, the eDRX cycle in the idle state and the eDRX cycle in the inactive state configured for the UE in the inactive state are longer than 10.24 seconds.

Illustratively, in response to determining that no eDRX cycle in the idle state is configured for the UE in the inactive state, the system message update comparison cycle is determined based on a minimum of a non-UE-specific paging cycle, a default paging cycle, and an RAN paging cycle.

Illustratively, in response to determining that the eDRX cycle in the idle state configured for the UE in the inactive state is shorter than or equal to the predetermined duration, the system message update comparison cycle of the UE in the inactive state is determined based on a shorter one of the eDRX cycle in the idle state and the eDRX cycle in the inactive state; and alternatively, the system message update comparison cycle of the UE in the inactive state is determined based on the eDRX cycle in the inactive state. For example, in response to determining that the eDRX cycle in the idle state configured for the UE in the inactive state is at least one of 10.24 seconds, 5.12 seconds, or 2.56 seconds, and the eDRX cycle in the inactive state configured for the UE in the inactive state is at least one of 10.24 seconds, 5.12 seconds, or 2.56 seconds, the system message update comparison cycle of the UE in the inactive state is determined as a shorter one of the eDRX cycle in the idle state and the eDRX cycle in the inactive state; and alternatively, the system message update comparison cycle of the UE in the inactive state is determined as the eDRX cycle in the inactive state.

Illustratively, in response to determining that the eDRX cycle in the idle state configured for the UE in the inactive state is shorter than or equal to the predetermined duration, and no eDRX cycle in the inactive state is configured for the UE in the inactive state, the system message update comparison cycle of the UE in the inactive state is determined based on a shorter one of the eDRX cycle in the idle state and the RAN paging cycle. For example, in response to determining that the eDRX cycle in the idle state configured for the UE in the inactive state is at least one of 10.24 seconds, 5.12 seconds, and 2.56 seconds, or no eDRX cycle in the inactive state is configured for the UE in the inactive state, the system message update comparison cycle of the UE in the inactive state is determined as a shorter one of the eDRX cycle in the idle state and the RAN paging cycle.

Illustratively, in response to determining that the eDRX cycle in the idle state configured for the UE in the inactive state is longer than the predetermined duration, and the eDRX cycle in the inactive state configured for the UE in the inactive state is shorter than or equal to the predetermined duration, the system message update comparison cycle of the UE in the inactive state is determined based on a shorter one of the eDRX cycle in the idle state and the eDRX cycle in the inactive state; alternatively, the system message update comparison cycle of the UE in the inactive state is determined based on the eDRX cycle in the idle state; and alternatively, the system message update comparison cycle of the UE in the inactive state is determined based on the eDRX cycle in the inactive state. For example, illustratively, in response to determining that the eDRX cycle in the idle state configured for the UE in the inactive state is longer than 10.24 seconds, and the eDRX cycle in the inactive state configured for the UE in the inactive state is at least one of 10.24 seconds, 5.12 seconds, or 2.56 seconds, the system message update comparison cycle of the UE in the inactive state is determined as a shorter one of the eDRX cycle in the idle state and the eDRX cycle in the inactive state; alternatively, the system message update comparison cycle of the UE in the inactive state is determined as the eDRX cycle in the idle state; and alternatively, the system message update comparison cycle of the UE in the inactive state is determined as the eDRX cycle in the inactive cycle.

Illustratively, in response to determining that the eDRX cycle in the idle state configured for the UE in the inactive state is longer than the predetermined duration, and no eDRX cycle in the inactive state is configured for the UE in the inactive state, the system message update comparison cycle is determined based on a shorter one of the eDRX cycle in the idle state and the RAN paging cycle or based on the eDRX cycle in the idle state. For example, in response to determining that the eDRX cycle in the idle state configured for the UE in the inactive state is longer than 10.24 seconds, and no eDRX cycle in the inactive state is configured for the UE in the inactive state, the system message update comparison cycle of the UE in the inactive state is determined as a shorter one of the eDRX cycle in the idle state and the RAN paging cycle; and alternatively, the system message update comparison cycle of the UE in the inactive state is determined as the eDRX cycle in the idle state.

Illustratively, in response to determining that the eDRX cycle in the idle state configured for the UE in the inactive state is longer than the predetermined duration, and the eDRX cycle in the inactive state configured for the UE in the inactive state is shorter than or equal to the predetermined duration, the system message update comparison cycle is determined based on a shorter one of the eDRX cycle in the idle state and the eDRX cycle in the inactive state; alternatively, the system message update comparison cycle is determined based on the eDRX cycle in the idle state; and alternatively, the system message update comparison cycle is determined based on the eDRX cycle in the inactive state. For example, in response to determining that the eDRX cycle in the idle state configured for the UE in the inactive state is 10.24 seconds, and the eDRX cycle in the inactive state configured for the UE in the inactive state is longer than 10.24 seconds, the system message update comparison cycle of the UE in the inactive state is determined as a shorter one of the eDRX cycle in the idle state and the eDRX cycle in the inactive state; alternatively, the system message update comparison cycle of the UE in the inactive state is determined as the eDRX cycle in the idle state; and alternatively, the system message update comparison cycle of the UE in the inactive state is determined as the eDRX cycle in the inactive cycle.

It needs to be noted that those skilled in the art can understand that the method according to the example of the disclosure may be executed alone or may be executed together with some methods in the example of the disclosure or some methods in the related art.

Figure 9:
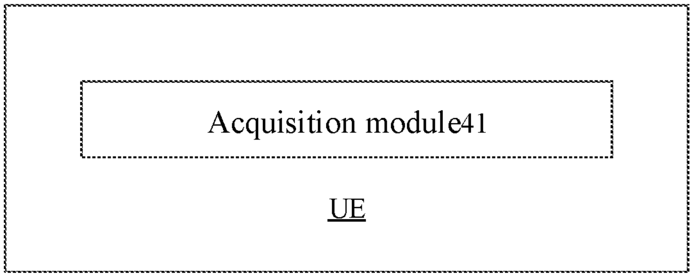
FIG. 9 is a block diagram of an apparatus for processing information shown according to an example.

As shown in FIG. 9, an apparatus for processing information is provided. The apparatus is applied to UE and includes: an acquisition module 41 configured to acquire, in response to determining that a system message update comparison cycle is longer than a system message update cycle, an updated system message according to an extended system message update cycle.

In an example, the extended system message update cycle is N times the system message update cycle, where N is greater than 1. The extended system message update cycle may be a duration agreed in a protocol.

The apparatus for processing information according to the example of the disclosure is applied to UE and may include: an acquisition module 41 configured to acquire, in response to determining that a system message update comparison cycle is longer than a system message update cycle, an updated system message at a boundary of an extended system message update cycle.

The apparatus for processing information according to the example of the disclosure is applied to UE and may include: an acquisition module 41 configured to receive an updated system message sent by the base station at a boundary of an extended system message update cycle in response to determining that a system message update comparison cycle of UE in an inactive state is longer than a system message update cycle.

The apparatus for processing information according to the example of the disclosure is applied to UE and may include: an acquisition module 41 configured to receive an updated system message sent by the core network at a boundary of an extended system message update cycle in response to determining that a system message update comparison cycle of UE in an inactive state is longer than a system message update cycle.

Figure 10:
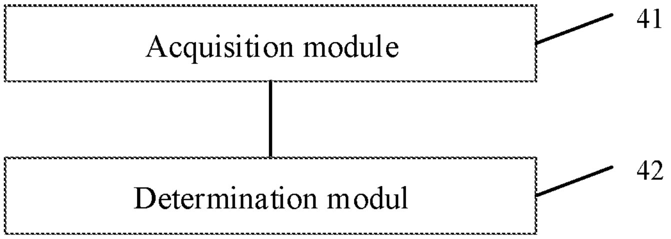
FIG. 10 is a block diagram of an apparatus for processing information according to an example.

As shown in FIG. 10, an apparatus for processing information according to an example of the disclosure is applied to UE and may include: a determination module 42 configured to determine a system message update comparison cycle of UE in an inactive state.

The apparatus for processing information according to the example of the disclosure is applied to UE and may include: a determination module 42 configured to determine a system message update comparison cycle based on a minimum of a UE-specific paging cycle, a default paging cycle, and an RAN paging cycle in response to determining that no eDRX cycle in an idle state is configured for the UE in the inactive state.

The apparatus for processing information according to the example of the disclosure is applied to UE and may include: a determination module 42 configured to determine, in response to determining that an eDRX cycle in an idle state configured for UE in an inactive state is shorter than or equal to predetermined duration, a system message update comparison cycle based on the eDRX cycle in the idle state and/or the eDRX cycle in the inactive state; and alternatively,

- a determination module 42 configured to determine, in response to determining that an eDRX cycle in an idle state configured for UE in an inactive state is shorter than or equal to predetermined duration, and no eDRX cycle in an inactive state is configured for the UE in the inactive state, a system message update comparison cycle based on a shorter one of the eDRX cycle in the idle state and an RAN paging cycle or based on the eDRX cycle in the idle state.

The apparatus for processing information according to the example of the disclosure is applied to UE and may include: a determination module 42 configured to determine, in response to determining that an eDRX cycle in an idle state configured for UE in an inactive state is shorter than or equal to predetermined duration, a system message update comparison cycle based on a shorter one of the eDRX cycle in the idle state and an eDRX cycle in an inactive state; and alternatively,

- a determination module 42 configured to determine, in response to determining that an eDRX cycle in an idle state configured for UE in an inactive state is shorter than or equal to a predetermined duration, a system message update comparison cycle based on an eDRX cycle in an inactive state.

The apparatus for processing information according to the example of the disclosure is applied to UE and may include: a determination module 42 configured to determine, in response to determining that an eDRX cycle in an idle state configured for UE in an inactive state is longer than predetermined duration, and an eDRX cycle in an inactive state configured for the UE in the inactive state is shorter than or equal to the predetermined duration, a system message update comparison cycle based on the eDRX cycle in the idle state and/or the eDRX cycle in the inactive state; and alternatively,

- a determination module 42 configured to determine, in response to determining that an eDRX cycle in an idle state configured for UE in an inactive state is longer than predetermined duration, and no eDRX cycle in an inactive state is configured for the UE in the inactive state, a system message update comparison cycle based on a shorter one of the eDRX cycle in the idle state and an RAN paging cycle or based on the eDRX cycle in the idle state.

The apparatus for processing information according to the example of the disclosure is applied to UE and may include: a determination module 42 configured for one of the following:

- determining, in response to determining that the eDRX cycle in the idle state configured for the UE in the inactive state is longer than the predetermined duration, and the eDRX cycle in the inactive state configured for the UE in the inactive state is shorter than or equal to the predetermined duration, the system message update comparison cycle based on a shorter one of the eDRX cycle in the idle state and the eDRX cycle in the inactive state; alternatively,
- determining, in response to determining that the eDRX cycle in the idle state configured for the UE in the inactive state is longer than the predetermined duration, and the eDRX cycle in the inactive state configured for the UE in the inactive state is shorter than or equal to the predetermined duration, the system message update comparison cycle based on the eDRX cycle in the inactive state; and alternatively,
- determining, in response to determining that the eDRX cycle in the idle state configured for the UE in the inactive state is longer than the predetermined duration, and the eDRX cycle in the inactive state configured for the UE in the inactive state is shorter than or equal to the predetermined duration, the system message update comparison cycle based on the eDRX cycle in the idle state.

The apparatus for processing information according to the example of the disclosure is applied to UE and may include: a determination module 42 configured to determine, in response to determining that an eDRX cycle in an idle state configured for UE in an inactive state is longer than predetermined duration, and no eDRX cycle in an inactive state is configured for the UE in the inactive state, a system message update comparison cycle based on the eDRX cycle in the idle state; and alternatively,

- a determination module 42 configured to determine, in response to determining that an eDRX cycle in an idle state configured for UE in an inactive state is longer than predetermined duration, and no eDRX cycle in an inactive state is configured for the UE in the inactive state, a system message update comparison cycle based on a shorter one of the eDRX cycle in the idle state and an RAN paging cycle.

The apparatus for processing information according to the example of the disclosure is applied to UE and may include: a determination module 42 configured to determine, in response to determining that an eDRX cycle in an idle state configured for UE in an inactive state is longer than predetermined duration, and an eDRX cycle in an inactive state configured for the UE in the inactive state is longer than the predetermined duration, a system message update comparison cycle based on the eDRX cycle in the idle state and/or the eDRX cycle in the inactive state.

The apparatus for processing information according to the example of the disclosure is applied to UE and may include: a determination module 42 configured for one of the following:

- determining, in response to determining that the eDRX cycle in the idle state configured for the UE in the inactive state is longer than the predetermined duration, and the eDRX cycle in the inactive state configured for the UE in the inactive state is longer than the predetermined duration, the system message update comparison cycle based on a shorter one of the eDRX cycle in the idle state and the eDRX cycle in the inactive state; alternatively, determining, in response to determining that the eDRX cycle in the idle state configured for the UE in the inactive state is longer than the predetermined duration, and the eDRX cycle in the inactive state configured for the UE in the inactive state is longer than the predetermined duration, the system message update comparison cycle based on the eDRX cycle in the inactive state; and alternatively, determining, in response to determining that the eDRX cycle in the idle state configured for the UE in the inactive state is longer than the predetermined duration, and the eDRX cycle in the inactive state configured for the UE in the inactive state is longer than the predetermined duration, the system message update comparison cycle based on the eDRX cycle in the idle state.

The apparatus for processing information according to the example of the disclosure is applied to UE and may include: a determination module 42 configured to determine an extended system message update cycle.

The apparatus for processing information according to the example of the disclosure is applied to UE and may include: a determination module 42 configured to determine an extended system message update cycle based on a network configuration or a specification in a communication protocol; and/or, a determination module 42 configured to determine an extended system message update cycle based on a type of the UE in the inactive state.

It need to be noted that those skilled in the art can understand that the apparatus according to the example of the disclosure may be executed alone or may be executed together with some apparatuses in the example of the disclosure or some apparatuses in related art.

For the apparatus in the above example, specific ways in which each module executes operations have been described in detail in the example relating to the method, which will not be described in detail here.

A communication device is provided in an example of the disclosure. The communication device includes:

a processor; and a memory configured to store a processor-executable instruction; where the processor is configured to implement the method for processing information according to any one of the examples of the disclosure when running the executable instruction.

In an example, the communication device may be UE.

The memory may include various types of storage media. The storage media are non-transitory computer storage media that may continue memorizing information stored after the user equipment is powered off.

The processor may be connected to the memory through a bus, etc., and configured to read an executable program stored in the memory, for example, at least one of the methods shown in FIGS. 3-8.

A non-transitory computer-readable storage medium is further provided in an example of the disclosure. The non-transitory computer-readable storage medium stores a computer-executable program, where the computer-executable program implements the method for processing information according to any one of the examples of the disclosure when executed by a processor, for example, at least one of the methods shown in FIGS. 3-8.

For the apparatus or storage medium in the above example, specific ways in which each module executes operations have been described in detail in the example relating to the method, which will not be described in detail here.

Figure 11:
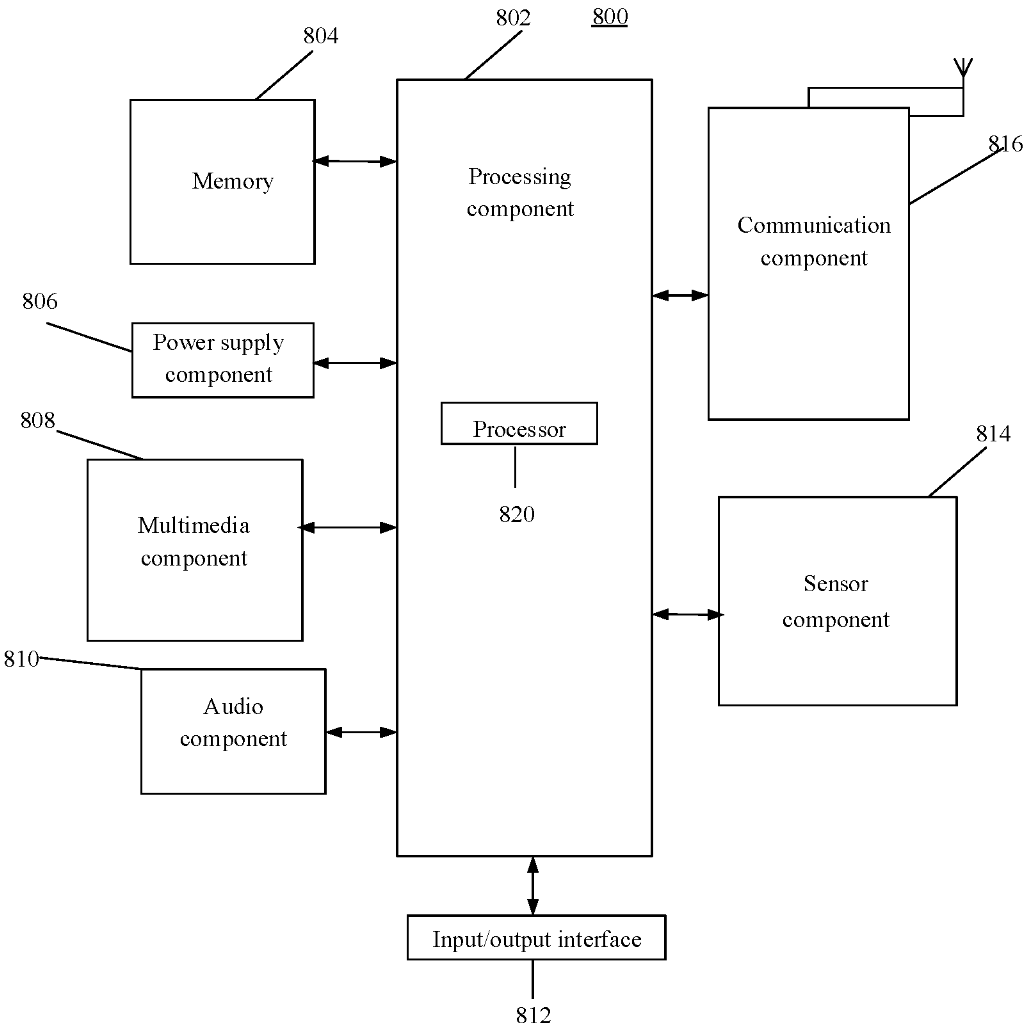
FIG. 11 is a block diagram of user equipment (UE) shown according to an example.

FIG. 11 is a block diagram of user equipment 800 shown according to an example. For example, the user equipment 800 may be a mobile phone, a computer, digital broadcast user equipment, a message transceiving device, a gaming console, a tablet device, a medical device, a fitness device, a personal digital assistant, etc.

With reference to FIG. 11, the user equipment 800 may include one or more of a processing component 802, a memory 804, a power supply component 806, a multimedia component 808, an audio component 810, an input/output (I/O) interface 812, a sensor component 814, and a communication component 816.

The processing component 802 typically controls an overall operation of the user equipment 800, for example, operations associated with display, phone calls, data communication, camera operations, and recording operations. The processing component 802 may include one or more processors 820 to execute instructions, so as to complete all or some of the steps of the above method. In addition, the processing component 802 may include one or more modules, so as to facilitate interaction between the processing component 802 and other components. For example, the processing component 802 may include a multimedia module, so as to facilitate interaction between the multimedia component 808 and the processing component 802.

The memory 804 is configured to store various types of data, so as to support the operations at the user equipment 800. Instances of these data include instructions for any application or method configured to be operated on the user equipment 800, contact data, phonebook data, messages, pictures, video, etc. The memory 804 may be implemented through any type of volatile or non-volatile storage devices or a combination of them, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 806 provides power for various components of the user equipment 800. The power supply component 806 may include a power supply management system, one or more power supplies, and other components associated with power generation, management, and distribution for the user equipment 800.

The multimedia component 808 includes a screen that provides an output interface between the user equipment 800 and a user. In some examples, the screen may include a liquid crystal display (LCD) and a touch panel (TP). If including the touch panel, the screen may be implemented as a touch screen, so as to receive an input signal from the user. The touch panel includes one or more touch sensors to sense touches, swipes, and gestures on the touch panel. Except for sensing a boundary of a touch or swipe action, the touch sensor may also measure duration and a pressure associated with a touch or swipe operation. In some examples, the multimedia component 808 includes a front-facing camera and/or a rear-facing camera. When the user equipment 800 is in an operating mode, such as a photographing mode or a video mode, the front-facing camera and/or the rear-facing camera may receive external multimedia data. Each of the front-facing camera and the rear-facing camera may be a fixed optical lens system or have a focal length and an optical zoom capacity.

The audio component 810 is configured to output and/or input audio signals. For example, the audio component 810 includes a microphone (MIC) configured to receive external audio signals when the user equipment 800 is in the operating mode, for example, a calling mode, a recording mode, and a speech recognition mode. The received audio signals may be further stored in the memory 804 or sent via the communication component 816. In some examples, the audio component 810 further includes a speaker configured to output the audio signals.

The I/O interface 812 provides an interface between the processing component 802 and a peripheral interface module. The above peripheral interface module may be a keyboard, a click wheel, and a button. These buttons may include, but is not limited to, a home button, a volume button, a start button, and a lock button.

The sensor component 814 includes one or more sensors configured to provide state assessments of various aspects for the user equipment 800. For example, the sensor component 814 may detect an on/off state of the user equipment 800 and relative locating of the components. For example, the components are a display and a keypad of the user equipment 800. The sensor component 814 may also detect a change in position of the user equipment 800 or one component of the user equipment 800, the presence or absence of contact between the user and the user equipment 800, orientation or acceleration/deceleration of the user equipment 800, and a change in temperature of the user equipment 800. The sensor component 814 may include a proximity sensor configured to detect the presence of a nearby object in the absence of any physical contact. The sensor component 814 may further include light sensors, such as a complementary metal-oxide-semiconductor transistor (CMOS) or a charge-coupled device (CCD) image sensor configured to be used in imaging application. In some examples, the sensor component 814 may further include an acceleration sensor, a gyroscopic sensor, a magnetic sensor, a pressure sensor, or a temperature sensor.

The communication component 816 is configured to facilitate communication between the user equipment 800 and other devices in a wired or wireless manner. The user equipment 800 may access a wireless network based on a communication standard, for example, wireless fidelity (WiFi), 2G or 3G, or a combination of them. In an example, the communication component 816 receives a broadcast signal or broadcast-related information from an external broadcast management system via a broadcast channel. In an example, the communication component 816 further includes a near field communication (NFC) module to facilitate short-range communication. For example, the NFC module may be implemented on the basis of a radio frequency identification (RFID) technology, an infrared data association (IrDA) technology, an ultra wide band (UWB) technology, a Bluetooth (BT) technology, etc.

In an example, the user equipment 800 may be implemented through one or more application specific integrated circuits (ASICs), digital signal processors (DSPs), digital signal processing devices (DSPDs), programmable logic devices (PLDs), field programmable gate array (FPGAs), controllers, microcontrollers, microprocessors, or other electronic elements configured to execute the above method.

A non-transitory computer-readable storage medium including an instruction, for example, a memory 804 including an instruction, is further provided in an example. The above instruction may be executed by the processor 820 of the user equipment 800, so as to complete the above method. For example, the non-transitory computer-readable storage medium may be an ROM, a random access memory (RAM), a compact disk read-only memory (CD-ROM), a magnetic tape, a floppy disc, an optical data storage device, etc.

Figure 12:
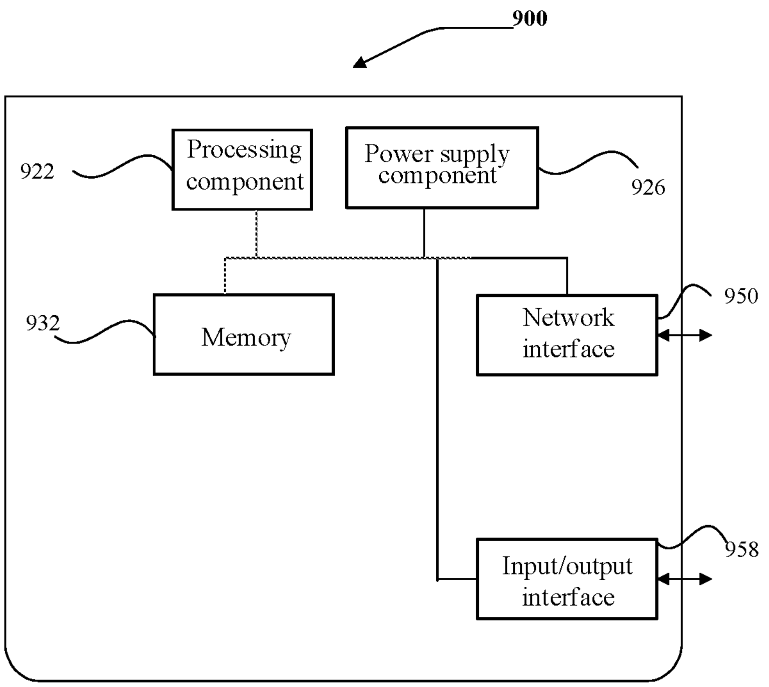
FIG. 12 is a block diagram of a base station shown according to an example.

A structure of a base station shown according to an example of the disclosure is as shown in FIG. 12. For example, the base station 900 may be provided as a network-side device. With reference to FIG. 12, the base station 900 includes a processing component 922, and further includes one or more processors and memory resources represented by a memory 932 and configured to store an instruction executable by the processing component 922, for example, an application. The application stored in the memory 932 may include one or more modules, each of which corresponds to a set of instructions. In addition, the processing component 922 is configured to execute an instruction, so as to execute any one of the above methods applied to the base station, for example, the methods shown in FIGS. 4-10.

The base station 900 may further include a power supply component 926 configured to execute power supply management of the base station 900, a wired or wireless network interface 950 configured to connect the base station 900 to a network, and an input/output (I/O) interface 958. The base station 900 may operate an operating system stored in the memory 932, such as Windows Server™, Mac OS X™, Unix™, Linux™, FreeBSD™, etc.

Other embodiments of the disclosure will readily occur to those skilled in the art upon consideration of the description and practice of the invention disclosed here. The disclosure is intended to cover any variations, uses, or adaptive changes of the disclosure that follow the general principles of the disclosure and include common general knowledge or customary technical means in the art not disclosed in the disclosure. The description and the examples are merely deemed illustrative, and the true scope and spirit of the disclosure are indicated by the following claims.

It should be understood that the disclosure is not limited to the precise structures that have been described above and shown in the accompanying drawings, and that various modifications and changes can be made without departing from the scope of the disclosure. The scope of the disclosure is merely limited by the appended claims.

Additional non-limiting embodiments of the disclosure include:

embodiment 1. A method for processing information, performed by user equipment (UE) and including:

acquiring, in response to determining that a system message update comparison cycle of UE in an inactive state is longer than a system message update cycle, an updated system message according to an extended system message update cycle.

embodiment 2. The method according to embodiment 1, where acquiring an updated system message according to an extended system message update cycle includes:

acquiring the updated system message at a boundary of the extended system message update cycle.

embodiment 3. The method according to embodiment 1 or 2, further including:

determining the system message update comparison cycle based on a minimum of a UE-specific paging cycle, a default paging cycle, and a radio access network (RAN) paging cycle in response to determining that no extended discontinuous reception (eDRX) cycle in an idle state is configured for the UE in the inactive state.

embodiment 4. The method according to embodiment 1 or 2, further including one of the following:

determining, in response to determining that an eDRX cycle in an idle state configured for the UE in the inactive state is shorter than or equal to a predetermined duration, the system message update comparison cycle based on the eDRX cycle in the idle state and/or an eDRX cycle in an inactive state; or determining, in response to determining that an eDRX cycle in an idle state configured for the UE in the inactive state is shorter than or equal to predetermined duration, and no eDRX cycle in an inactive state is configured for the UE in the inactive state, the system message update comparison cycle based on a shorter one of the eDRX cycle in the idle state and an RAN paging cycle or based on the eDRX cycle in the idle state.

embodiment 5. The method according to embodiment 4, where determining, in response to determining that an eDRX cycle in an idle state configured for the UE in the inactive state is shorter than or equal to predetermined duration, the system message update comparison cycle based on the eDRX cycle in the idle state and/or an eDRX cycle in an inactive state includes one of the following:

determining, in response to determining that the eDRX cycle in the idle state configured for the UE in the inactive state is shorter than or equal to the predetermined duration, the system message update comparison cycle based on a shorter one of the eDRX cycle in the idle state and the eDRX cycle in the inactive state; or determining, in response to determining that the eDRX cycle in the idle state configured for the UE in the inactive state is shorter than or equal to the predetermined duration, the system message update comparison cycle based on the eDRX cycle in the inactive state.

embodiment 6. The method according to embodiment 1 or 2, further including one of the following:

determining, in response to determining that an eDRX cycle in an idle state configured for the UE in the inactive state is longer than predetermined duration, and an eDRX cycle in an inactive state configured for the UE in the inactive state is shorter than or equal to the predetermined duration, the system message update comparison cycle based on the eDRX cycle in the idle state and/or the eDRX cycle in the inactive state; or determining, in response to determining that an eDRX cycle in an idle state configured for the UE in the inactive state is longer than predetermined duration, and no eDRX cycle in an inactive state is configured for the UE in the inactive state, the system message update comparison cycle based on a shorter one of the eDRX cycle in the idle state and an RAN paging cycle or based on the eDRX cycle in the idle state.

embodiment 7. The method according to embodiment 6, where determining, in response to determining that an eDRX cycle in an idle state configured for the UE in the inactive state is longer than predetermined duration, and an eDRX cycle in an inactive state configured for the UE in the inactive state is shorter than or equal to the predetermined duration, the system message update comparison cycle based on the eDRX cycle in the idle state and/or the eDRX cycle in the inactive state includes one of the following:

determining, in response to determining that the eDRX cycle in the idle state configured for the UE in the inactive state is longer than the predetermined duration, and the eDRX cycle in the inactive state configured for the UE in the inactive state is shorter than or equal to the predetermined duration, the system message update comparison cycle based on a shorter one of the eDRX cycle in the idle state and the eDRX cycle in the inactive state;

determining, in response to determining that the eDRX cycle in the idle state configured for the UE in the inactive state is longer than the predetermined duration, and the eDRX cycle in the inactive state configured for the UE in the inactive state is shorter than or equal to the predetermined duration, the system message update comparison cycle based on the eDRX cycle in the inactive state; or determining, in response to determining that the eDRX cycle in the idle state configured for the UE in the inactive state is longer than the predetermined duration, and the eDRX cycle in the inactive state configured for the UE in the inactive state is shorter than or equal to the predetermined duration, the system message update comparison cycle based on the eDRX cycle in the idle state.

embodiment 8. The method according to embodiment 1 or 2, further including:

determining, in response to determining that an eDRX cycle in an idle state configured for the UE in the inactive state is longer than predetermined duration, and an eDRX cycle in an inactive state configured for the UE in the inactive state is longer than the predetermined duration, the system message update comparison cycle based on the eDRX cycle in the idle state and/or the eDRX cycle in the inactive state.

embodiment 9. The method according to embodiment 8, where determining, in response to determining that an eDRX cycle in an idle state configured for the UE in the inactive state is longer than predetermined duration, and an eDRX cycle in an inactive state configured for the UE in the inactive state is longer than the predetermined duration, the system message update comparison cycle based on the eDRX cycle in the idle state and/or the eDRX cycle in the inactive state includes one of the following:

determining, in response to determining that the eDRX cycle in the idle state configured for the UE in the inactive state is longer than the predetermined duration, and the eDRX cycle in the inactive state configured for the UE in the inactive state is longer than the predetermined duration, the system message update comparison cycle based on a shorter one of the eDRX cycle in the idle state and the eDRX cycle in the inactive state;

determining, in response to determining that the eDRX cycle in the idle state configured for the UE in the inactive state is longer than the predetermined duration, and the eDRX cycle in the inactive state configured for the UE in the inactive state is longer than the predetermined duration, the system message update comparison cycle based on the eDRX cycle in the inactive state; or determining, in response to determining that the eDRX cycle in the idle state configured for the UE in the inactive state is longer than the predetermined duration, and the eDRX cycle in the inactive state configured for the UE in the inactive state is longer than the predetermined duration, the system message update comparison cycle based on the eDRX cycle in the idle state.

embodiment 10. The method according to embodiment 1 or 2, further including:

determining the extended system message update cycle.

embodiment 11. The method according to embodiment 10, where determining the extended system message update cycle includes at least one of the following:

determining the extended system message update cycle based on a network configuration or a specification in a communication protocol; or determining the extended system message update cycle based on a type of the UE in the inactive state.

embodiment 12. An apparatus for processing information, applied to user equipment (UE) and including:

an acquisition module configured to acquire, in response to determining that a system message update comparison cycle of UE in an inactive state is longer than a system message update cycle, an updated system message according to an extended system message update cycle.

embodiment 13. The apparatus according to embodiment 12, where the acquisition module is configured to acquire the updated system message at a boundary of the extended system message update cycle.

embodiment 14. The apparatus according to embodiment 12 or 13, further including:

a determination module configured to determine the system message update comparison cycle based on a minimum of a UE-specific paging cycle, a default paging cycle, and a radio access network (RAN) paging cycle in response to determining that no eDRX cycle in an idle state is configured for the UE in the inactive state.

embodiment 15. The apparatus according to embodiment 12 or 13, further including:

a determination module configured to determine, in response to determining that an eDRX cycle in an idle state configured for the UE in the inactive state is shorter than or equal to predetermined duration, the system message update comparison cycle based on the eDRX cycle in the idle state and/or an eDRX cycle in an inactive state; or a determination module configured to determine, in response to determining that an eDRX cycle in an idle state configured for the UE in the inactive state is shorter than or equal to predetermined duration, and no eDRX cycle in an inactive state is configured for the UE in the inactive state, the system message update comparison cycle based on a shorter one of the eDRX cycle in the idle state and an RAN paging cycle.

embodiment 16. The apparatus according to embodiment 15, where the determination module is configured to determine, in response to determining that the eDRX cycle in the idle state configured for the UE in the inactive state is shorter than or equal to the predetermined duration, the system message update comparison cycle based on a shorter one of the eDRX cycle in the idle state and the eDRX cycle in the inactive state; or the determination module is configured to determine, in response to determining that the eDRX cycle in the idle state configured for the UE in the inactive state is shorter than or equal to the predetermined duration, the system message update comparison cycle based on the eDRX cycle in the inactive state.

embodiment 17. The apparatus according to embodiment 12 or 13, further including:

a determination module configured to determine, in response to determining that an eDRX cycle in an idle state configured for the UE in the inactive state is longer than predetermined duration, and an eDRX cycle in an inactive state configured for the UE in the inactive state is shorter than or equal to the predetermined duration, the system message update comparison cycle based on the eDRX cycle in the idle state and/or the eDRX cycle in the inactive state; or a determination module configured to determine, in response to determining that an eDRX cycle in an idle state configured for the UE in the inactive state is longer than predetermined duration, and no eDRX cycle in an inactive state is configured for the UE in the inactive state, the system message update comparison cycle based on a shorter one of the eDRX cycle in the idle state and an RAN paging cycle or based on the eDRX cycle in the idle state.

embodiment 18. The apparatus according to embodiment 17, where the determination module is configured for one of the following:

determining, in response to determining that the eDRX cycle in the idle state configured for the UE in the inactive state is longer than the predetermined duration, and the eDRX cycle in the inactive state configured for the UE in the inactive state is shorter than or equal to the predetermined duration, the system message update comparison cycle based on a shorter one of the eDRX cycle in the idle state and the eDRX cycle in the inactive state;

determining, in response to determining that the eDRX cycle in the idle state configured for the UE in the inactive state is longer than the predetermined duration, and the eDRX cycle in the inactive state configured for the UE in the inactive state is shorter than or equal to the predetermined duration, the system message update comparison cycle based on the eDRX cycle in the inactive state; or determining, in response to determining that the eDRX cycle in the idle state configured for the UE in the inactive state is longer than the predetermined duration, and the eDRX cycle in the inactive state configured for the UE in the inactive state is shorter than or equal to the predetermined duration, the system message update comparison cycle based on the eDRX cycle in the idle state.

embodiment 19. The apparatus according to embodiment 12 or 13, further including:

a determination module configured to determine, in response to determining that an eDRX cycle in an idle state configured for the UE in the inactive state is longer than predetermined duration, and an eDRX cycle in an inactive state configured for the UE in the inactive state is longer than the predetermined duration, the system message update comparison cycle based on the eDRX cycle in the idle state and/or the eDRX cycle in the inactive state.

embodiment 20. The apparatus according to embodiment 19, where the determination module is configured for one of the following:

determining, in response to determining that the eDRX cycle in the idle state configured for the UE in the inactive state is longer than the predetermined duration, and the eDRX cycle in the inactive state configured for the UE in the inactive state is longer than the predetermined duration, the system message update comparison cycle based on a shorter one of the eDRX cycle in the idle state and the eDRX cycle in the inactive state;

determining, in response to determining that the eDRX cycle in the idle state configured for the UE in the inactive state is longer than the predetermined duration, and the eDRX cycle in the inactive state configured for the UE in the inactive state is longer than the predetermined duration, the system message update comparison cycle based on the eDRX cycle in the inactive state; or determining, in response to determining that the eDRX cycle in the idle state configured for the UE in the inactive state is longer than the predetermined duration, and the eDRX cycle in the inactive state configured for the UE in the inactive state is longer than the predetermined duration, the system message update comparison cycle based on the eDRX cycle in the idle state.

embodiment 21. The apparatus according to embodiment 12 or 13, further including:

a determination module configured to determine the extended system message update cycle.

embodiment 22. The apparatus according to embodiment 21, where the determination module is configured to determine the extended system message update cycle based on a network configuration or a specification in a communication protocol;

and/or, the determination module is configured to determine the extended system message update cycle based on a type of the UE in the inactive state.

embodiment 23. A communication device, including:

a processor; and a memory configured to store a processor-executable instruction; where the processor is configured to implement the method for processing information according to any one of embodiments 1-11 when running the executable instruction.

embodiment 24. A non-transitory computer-readable storage medium, storing a computer-executable instruction, where the executable instruction implements the method for processing information according to any one of embodiments 1-11 when executed by a processor.

The invention claimed is:

1. A method for processing information, performed by user equipment (UE) and comprising:

acquiring, in response to determining that a system message update comparison cycle of UE in an inactive state is longer than a system message update cycle, an updated system message according to an extended system message update cycle, wherein the system message update comparison cycle is an IDLE extended discontinuous reception (eDRX) cycle;

wherein acquiring the updated system message according to the extended system message update cycle comprises:

acquiring the updated system message at a boundary of the extended system message update cycle, wherein the extended system message update cycle is duration agreed upon in a communication protocol.

2. The method according to claim 1, further comprising:

determining the system message update comparison cycle based on a minimum of a UE-specific paging cycle, a default paging cycle, and a radio access network (RAN) paging cycle in response to determining that no IDLE eDRX cycle is configured for the UE in the inactive state.

3. The method according to claim 1, further comprising:

determining, in response to determining that an IDLE eDRX cycle configured for the UE in the inactive state is shorter than or equal to predetermined duration, the system message update comparison cycle based on at least one of the IDLE eDRX cycle or an INACTIVE eDRX cycle.

4. The method according to claim 3, wherein determining, in response to determining that the IDLE eDRX cycle configured for the UE in the inactive state is shorter than or equal to the predetermined duration, the system message update comparison cycle based on at least one of the IDLE eDRX cycle or the INACTIVE eDRX cycle comprises:

determining, in response to determining that the IDLE eDRX cycle configured for the UE in the inactive state is shorter than or equal to the predetermined duration, the system message update comparison cycle based on a shorter one of the IDLE eDRX cycle and the INACTIVE eDRX cycle.

5. The method according to claim 1, further comprising:

determining, in response to determining that an IDLE eDRX cycle configured for the UE in the inactive state is longer than predetermined duration, and an INACTIVE eDRX cycle configured for the UE in the inactive state is shorter than or equal to the predetermined duration, the system message update comparison cycle based on at least one of the IDLE eDRX cycle or the INACTIVE eDRX cycle.

6. The method according to claim 5, wherein determining, in response to determining that the IDLE eDRX cycle configured for the UE in the inactive state is longer than the predetermined duration, and the INACTIVE eDRX cycle configured for the UE in the inactive state is shorter than or equal to the predetermined duration, the system message update comparison cycle based on at least one of the IDLE eDRX cycle or the INACTIVE eDRX cycle comprises:

determining, in response to determining that the IDLE eDRX cycle configured for the UE in the inactive state is longer than the predetermined duration, and the INACTIVE eDRX cycle configured for the UE in the inactive state is shorter than or equal to the predetermined duration, the system message update comparison cycle based on a shorter one of the IDLE eDRX cycle and the INACTIVE eDRX cycle.

7. The method according to claim 1, further comprising:

determining, in response to determining that an IDLE eDRX cycle configured for the UE in the inactive state is longer than predetermined duration, and an INACTIVE eDRX cycle configured for the UE in the inactive state is longer than the predetermined duration, the system message update comparison cycle based on at least one of the IDLE eDRX cycle or the INACTIVE eDRX cycle.

8. The method according to claim 7, wherein determining, in response to determining that the IDLE eDRX cycle configured for the UE in the inactive state is longer than the predetermined duration, and the INACTIVE eDRX cycle configured for the UE in the inactive state is longer than the predetermined duration, the system message update comparison cycle based on at least one of the IDLE eDRX cycle or the INACTIVE eDRX cycle comprises:

determining, in response to determining that the IDLE eDRX cycle configured for the UE in the inactive state is longer than the predetermined duration, and the INACTIVE eDRX cycle configured for the UE in the inactive state is longer than the predetermined duration, the system message update comparison cycle based on a shorter one of the IDLE eDRX cycle and the INACTIVE eDRX cycle.

9. The method according to claim 1, further comprising: determining the extended system message update cycle.

10. The method according to claim 9, wherein determining the extended system message update cycle comprises at least one of:

determining the extended system message update cycle based on a network configuration or a specification in the communication protocol; or determining the extended system message update cycle based on a type of the UE in the inactive state.

11. A communication device, comprising:

a memory configured to store a processor-executable instruction, one or more processors that are communicatively coupled to the memory, wherein the one or more processors are collectively configured to:

acquire, in response to determining that a system message update comparison cycle of user equipment (UE) in an inactive state is longer than a system message update cycle, an updated system message according to an extended system message update cycle, wherein the system message update comparison cycle is an IDLE extended discontinuous reception (eDRX) cycle;

wherein the one or more processors are further collectively configured, in response to acquiring the updated system message according to the extended system message update cycle, to:

acquire the updated system message at a boundary of the extended system message update cycle, wherein the extended system message update cycle is duration agreed upon in a communication protocol.

12. A non-transitory computer-readable storage medium, storing a computer-executable instruction, wherein the computer-executable instruction, when executed by a processor, causes the processor to execute a method comprising:

acquiring, in response to determining that a system message update comparison cycle of user equipment (UE) in an inactive state is longer than a system message update cycle, an updated system message according to an extended system message update cycle, wherein the system message update comparison cycle is an IDLE extended discontinuous reception (eDRX) cycle;

wherein acquiring the updated system message according to the extended system message update cycle comprises:

acquiring the updated system message at a boundary of the extended system message update cycle, wherein the extended system message update cycle is duration agreed upon in a communication protocol.

13. The method according to claim 1, further comprising:

determining, in response to determining that an IDLE eDRX cycle configured for the UE in the inactive state is shorter than or equal to predetermined duration, and no INACTIVE eDRX cycle is configured for the UE in the inactive state, the system message update comparison cycle based on a shorter one of the IDLE eDRX cycle and a radio access network (RAN) paging cycle or based on the IDLE eDRX cycle.

14. The method according to claim 3, wherein determining, in response to determining that the IDLE eDRX cycle configured for the UE in the inactive state is shorter than or equal to the predetermined duration, the system message update comparison cycle based on at least one of the IDLE eDRX cycle or the INACTIVE eDRX cycle comprises:

determining, in response to determining that the IDLE eDRX cycle configured for the UE in the inactive state is shorter than or equal to the predetermined duration, the system message update comparison cycle based on the INACTIVE eDRX cycle.

15. The method according to claim 1, further comprising:

determining, in response to determining that an IDLE eDRX cycle configured for the UE in the inactive state is longer than predetermined duration, and no INACTIVE eDRX cycle is configured for the UE in the inactive state, the system message update comparison cycle based on a shorter one of the IDLE eDRX cycle and a radio access network (RAN) paging cycle or based on the IDLE eDRX cycle.

16. The method according to claim 5, wherein determining, in response to determining that the IDLE eDRX cycle configured for the UE in the inactive state is longer than the predetermined duration, and the INACTIVE eDRX cycle configured for the UE in the inactive state is shorter than or equal to the predetermined duration, the system message update comparison cycle based on at least one of the IDLE eDRX cycle or the INACTIVE eDRX cycle comprises:

determining, in response to determining that the IDLE eDRX cycle configured for the UE in the inactive state is longer than the predetermined duration, and the INACTIVE eDRX cycle configured for the UE in the inactive state is shorter than or equal to the predetermined duration, the system message update comparison cycle based on the INACTIVE eDRX cycle.

17. The method according to claim 5, wherein determining, in response to determining that the IDLE eDRX cycle configured for the UE in the inactive state is longer than the predetermined duration, and the INACTIVE eDRX cycle configured for the UE in the inactive state is shorter than or equal to the predetermined duration, the system message update comparison cycle based on at least one of the IDLE eDRX cycle or the INACTIVE eDRX cycle comprises:

determining, in response to determining that the IDLE eDRX cycle configured for the UE in the inactive state is longer than the predetermined duration, and the INACTIVE eDRX cycle configured for the UE in the inactive state is shorter than or equal to the predetermined duration, the system message update comparison cycle based on the IDLE eDRX cycle.

18. The method according to claim 7, wherein determining, in response to determining that the IDLE eDRX cycle configured for the UE in the inactive state is longer than the predetermined duration, and the INACTIVE eDRX cycle configured for the UE in the inactive state is longer than the predetermined duration, the system message update comparison cycle based on at least one of the IDLE eDRX cycle or the INACTIVE eDRX cycle comprises:

determining, in response to determining that the IDLE eDRX cycle configured for the UE in the inactive state is longer than the predetermined duration, and the INACTIVE eDRX cycle configured for the UE in the inactive state is longer than the predetermined duration, the system message update comparison cycle based on the INACTIVE eDRX cycle.

19. The method according to claim 7, wherein determining, in response to determining that the IDLE eDRX cycle configured for the UE in the inactive state is longer than the predetermined duration, and the INACTIVE eDRX cycle configured for the UE in the inactive state is longer than the predetermined duration, the system message update comparison cycle based on at least one of the IDLE eDRX cycle or the INACTIVE eDRX cycle comprises:

determining, in response to determining that the IDLE eDRX cycle configured for the UE in the inactive state is longer than the predetermined duration, and the INACTIVE eDRX cycle configured for the UE in the inactive state is longer than the predetermined duration, the system message update comparison cycle based on the IDLE eDRX cycle.

20. The method according to claim 1, wherein a duration of the extended system message update cycle is a multiple of 10.24 seconds.

* * * * *